United States Patent
Hamano et al.

(10) Patent No.: US 6,525,563 B2
(45) Date of Patent: *Feb. 25, 2003

(54) CROSSPOINT SWITCH CIRCUIT AND SWITCH CELL ELECTRONIC CIRCUIT

(75) Inventors: Hiroshi Hamano; Takuji Yamamoto; Satoshi Kuroyanagi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,802

(22) Filed: Dec. 20, 1999

(65) Prior Publication Data

US 2002/0171451 A1 Nov. 21, 2002

(30) Foreign Application Priority Data

Dec. 25, 1998 (JP) .......................... 10-370476

(51) Int. Cl.[7] ........................................... H03K 19/177
(52) U.S. Cl. ........................ 326/41; 326/101; 307/113
(58) Field of Search ............................. 326/41, 38, 39, 326/47, 101, 102; 307/115, 113, 130

(56) References Cited

U.S. PATENT DOCUMENTS

| 3,674,938 | A | * | 7/1972 | Jacob .......................... 370/379 |
| 4,775,207 | A | * | 10/1988 | Silberberg ...................... 385/8 |
| 5,309,006 | A | * | 5/1994 | Willems et al. ................ 236/11 |
| 5,336,950 | A | * | 8/1994 | Popli et al. ..................... 326/39 |
| 5,541,914 | A | * | 7/1996 | Krishnamoorthy et al. . 370/427 |

FOREIGN PATENT DOCUMENTS

| JP | 61025322 A | * | 2/1986 | .................. 307/115 |
| JP | 4099307428 A | * | 11/1997 | |
| WO | WO 87/04886 | | 8/1987 | |
| WO | WO 89/01262 | | 2/1989 | |

OTHER PUBLICATIONS

Toshio Shimoe, et al., A Path–Independent–Insertion–Loss Optical Space Switching Network, 1987, IEEE, pp. 0999–1003.

* cited by examiner

Primary Examiner—Michael Tokar
Assistant Examiner—James H Cho
(74) Attorney, Agent, or Firm—Staas & Halsey LLP

(57) ABSTRACT

The present invention relates to a technology of a crosspoint switch circuit applied to a cross-connect apparatus, an ADM or the like employed in an optical network. According to the present invention, there is provided an arrangement of a crosspoint switch circuit including a plurality of switch cells arrayed in a matrix fashion to form a matrix array, each of the switch cells being formed of a two-input and two-output type switch having a first and second input terminals and a first and second output terminals in which either of the input terminals is made connectable to any of the output terminals, and each of the switch cells being interconnected and controlled in each connecting status so that any one of input highway is made connectable to any of output highway, and external connecting unit provided on each side of the matrix array so that the switch cells arrayed on each side of the matrix array are made connectable to switch cells arrayed on any side of a matrix array of another crosspoint switch circuit which is to neighbor that crosspoint switch circuit. According to the above arrangement, the crosspoint switch circuit can easily and flexibly respond to a request of extensively increasing the channel size under a minimum space limitation. Moreover, the crosspoint switch circuit can be assembled and manufactured with ease.

30 Claims, 26 Drawing Sheets

BAR

CROSS

POINT-TO-MULTIPOINT
(FROM A TO C AND D)

POINT-TO-MULTIPOINT
(FROM B TO C AND D)

LATTICE TYPE SWITCH ( N x G )

NON-BLOCKING THREE-STAGE LINK SYSTEM

CROSSPOINT SWITCH CIRCUIT AND SWITCH CELL ELECTRONIC CIRCUIT

BACKGROUND OF THE INVENTION (1) Field of the Invention

The present invention relates to a crosspoint switch circuit and a switch cell electronic circuit, and more particularly the present invention relates to a crosspoint switch circuit and a switch cell electronic circuit suitable for use in a channel switching function unit necessary for a transmitting apparatus (e.g., an optical cross-connect apparatus or an optical ADM (Add Drop Multiplexer) or the like) utilized on an optical network using WDM (Wavelength Division Multiplex) technology.

(2) Description of the Related Art

Recently, as is represented by the Internet, demand in communication is dramatically increasing. In order to cope with the increase of demand in communication, it becomes indispensable to build a photonic network having a great amount of capacity capable of transmitting a signal at an ultrahigh bit-rate (e.g., ten gigabit to about terabit in the future) using the WDM technology, as is shown schematically in FIG. 21, for example. When such a photonic network is built, the optical cross-connect apparatus (OXC) or the optical ADM are utilized in general.

The optical cross-connect apparatus (OXC) is an apparatus useful for receiving a WDM signal and capable of generating (cross-connect) any channel signal in the unit of wavelength (channel) (see FIG. 22). The optical ADM is an apparatus for carrying out Add/Drop/Through control in the unit of channel on the received WDM signal, whereby an optical signal on a certain channel transmitted from a desired network is inserted (added) to a main channel signal, an optical signal on a certain channel is extracted from the main channel signal and branched (dropped) to the desired network, and an optical signal on a certain channel in the main channel is sent through the apparatus without any drop operation (see FIG. 23).

Therefore, if the optical cross-connect apparatus or the optical ADM are provided in a desired area upon request as shown in FIGS. 22 and 23, then signals transmitted in any network such as a transmission network of SDH (Synchronous Digital Hierarchy), SONET (Synchronous Optical Network), ATM (Asynchronous Transfer Mode) or the like can be transmitted in a form of optical signal at a high bit-rate to a desired network in the unit of channel. Thus, it is possible to build an optical network capable of providing a flexible transmission service.

To this end, it is necessary for the above-described optical cross-connect apparatus or the optical ADM to be equipped with a switching system for switching the optical signal channel. That is, the optical cross-connect apparatus requires a switch of a multi-input and multi-output type (so called crosspoint switch) in which WDM signal transmission paths established in a bundle of optical fibers are dynamically switched in the unit of channel. The optical ADM requires a crosspoint switch capable of diverting an optical signal of all the channels from the main channel so as to switch the connection destination.

As for the crosspoint switch, a type of optical (space) switch is now under research and development in which the channel switching can be carried out with maintaining the mode of the signal as an optical signal. As one representative optical switch, named is a PI-LOSS (Path-independent Insertion on Loss) type optical switch. The PI-LOSS type optical switch has an arrangement in which, as for example shown in FIG. 24, a plurality of optical waveguides 101 are formed on a substrate 100 so that they cross one another at crosspoints (Sxy: $1 \leq x \leq 4$, $1 \leq y \leq 4$) and temperatures at the crosspoints are controlled to change the refractive index at the crosspoint, whereby the optical signal path is switched.

In more specifically, the temperature of the crosspoints are controlled so that only one of the crosspoints Sxy of the optical path 101 becomes the bar status and all other crosspoints of the optical path 101 become the cross status. Thus, optical signals sent to an input highway #x can be outputted to an output highway #y. For example, if only the crosspoint S12 (x=1, y=2) is controlled to be the bar status, the optical signal sent to the input highway #1 will pass through a path indicated with a bold solid line shown in FIG. 24 and finally outputted at the output highway #2.

That is, according to the above-described PI-LOSS type optical switch, each of the crosspoints Sxy is formed into a switch cell of a two-input two-output type, and the switch cells are arrayed and interconnected one another to form a matrix of four rows and four columns (4×4). Then, one of the switch cells Sxy is controlled to be the bar status in its connecting status, thus any one of the input highway #x can be connected to any output highway #y.

Since the PI-LOSS type optical switch has the arrangement described above, the following merits can be obtained, for example.

① The number of crosspoints (switch cell) Sxy that the optical signal undergoes becomes constant (four in the example shown in FIG. 24) regardless of choice of the optical path. Therefore, the optical signal from the input terminal to any of the output highway #y through each path is subjected to the same amount of loss, with the result that there is no scattering expected in the optical signal level deriving from each of the output highway #y.

② Since the switch cells Sxy are interconnected one another byway of the optical waveguides 101, crosstalk between paths can be effectively suppressed.

The above-described PI-LOSS type optical switch of a size of 8×8 is brought into a practical application stage. The PI-LOSS type optical switch is arranged as a non-blocking type switch.

On the other hand, a crosspoint switch made of an electronic circuit (hereinafter sometimes referred to as simply "electric switch") is placed under research and development by manufactures. This is because if the network employs the optical cross-connect apparatus or the optical ADM, in order to compensate the loss of the signal caused in the process of signal transmission, the received signal is often once received and terminated by a receiver within the apparatus so that the optical signal is converted into an electric signal. Thus, there is a circumstance that the electric switch is more applicable than the optical switch.

The most popular type of the electric switch has a mesh structure (lattice arrangement with N inputs and G outputs: N and G are integers greater than 1) as for example shown in FIG. 25. The above electric switch has advantages that it can be manufactured with ease to be more small-sized, less expensive and lower electric consumption as compared with the above-introduced optical switch. Now, electric switch 200 having 16×16 input and output ports capable of dealing with a signal of ten gigabit (Gb/s) at an ultrahigh rate is under the stage of research and development.

Incidentally, if a large-sized (large capacity) optical network mainly composed of a WDM system of multiwavelength (e.g., 32 wavelengths or more are simultaneously transmitted per fiber) is requested to build, the crosspoint switch employed in the above-described situation is requested to deal with a signal of an ultra-high bit-rate (10 Gb/s) whichever the signal is of the optical mode or electric mode. Further, the crosspoint switch is requested to be independent of the signal bit-rate. For example, if the network employs the optical ADM, the crosspoint switch utilized in the network shall be arranged to have at least 16×16 input and output terminals. If the network employs the optical cross-connect apparatus, the crosspoint switch utilized in the network shall be arranged to have at least 512×512 input and output terminals.

However, as has been described above, as the crosspoint switch which can deal with a signal of an ultra-high bit-rate (about 10 Gb/s) and arranged as a single-stage link arrangement, the largest crosspoint switch that has been successfully developed so far, has only 8×8 or 16×16 input and output terminals. Thus, it is very difficult to realize a crosspoint switch having a larger number of input and output terminals.

For example, if the crosspoint switch is formed as an optical switch (PI-LOSS type switch), when the optical signal undergoes the crosspoint Sxy of the optical waveguide 101, the signal level will be decreased. Which fact makes it difficult to make the system into a multi-channel arrangement. In order to solve the problem, any amplifying function such as an optical amplifier or the like may be inserted at the input or output port of each channel. However, it is expensive to build such an arrangement, and further the size of the apparatus becomes large and electric power consumption is increased.

Since the PI-LOSS type optical switch employs the optical waveguide 101, the substrate 100 supporting the optical waveguides necessarily becomes long, which fact prevents the PI-LOSS type optical switch from being small-sized. Therefore, it is difficult to construct a switch having a large number of channels. Further, as has been described above, since the switching control is carried out by changing the temperature of the crosspoint, a temperature controller or the like is necessary for each crosspoint Sxy, which fact makes the overall arrangement of the switch large. Thus, it is also difficult to construct a switch having a large number of channels.

Recently, the crosspoint switch comes to be requested to have a point-to-multipoint communication function (e.g., a function that one input is distributed to two or more outputs) in addition to the above-described cross-connection or bar-connection. However, because of a reason that it is not easy to compensate the optical loss caused upon distributing the optical signal or some other reason, it is difficult to realize such a point-to-multipoint communication function.

On the other hand, if the electric switch 200 having the mesh structure as shown in FIG. 25 is employed in the communication network, the number of electric switches the signal transmission path undergoes will differ for each channel. Therefore, the larger the channel size becomes, the greater difference will be caused in the signal transmission time, an output waveform and so on between the channels. Further, since the electric switch 200 employs electric wiring, if the size of channel is made large, there is caused a large influence of the strayed capacity and inductance of the wiring, the capacitive coupling caused between three-dimensionally intersected wires and so on. Therefore, it becomes extremely difficult to stabilize the characteristic of the signal transmitted at an ultrahigh bit-rate such as 10 Gb/s. Further, large influence can be expected from crosstalk between the wires.

Therefore, if the crosspoint switch is arranged as a single body arrangement (hereinafter referred to as a unit switch), then it is difficult to make the unit switch have a multi-channel arrangement of about 512×512 input and output terminals whichever the crosspoint switch is designed to deal with an optical signal or an electric signal.

One of possible arrangements for solving the above problem is an arrangement, as for example shown in FIG. 26, in which a plurality of unit switches 300 are interconnected to one another to form a multistage arrangement (multistage link arrangement) like a switch arrangement utilized in an exchanger or the like. This arrangement is one possible choice to increase the number of channels that the switching system can deal with. In this case, however, wire connection between the unit switch becomes very complicated. That is, great number of three-dimensional wire crossing is necessary, with the result that it becomes impossible to design the switching system with a simple plain interconnection.

When an ultra-high bit-rate signal of about 10 Gb/s is transmitted within the switching system, the unit switches shall be connected through a coaxial cable, an optical fiber or the like. When the connecting components are connected in a complicated wiring manner, very large space is required, or the size of the apparatus becomes large, with the result that it becomes difficult to make the apparatus small. Further, wiring work requires a lot of labor and a large number of steps, that is, assembling and manufacturing processes will also become difficult. Accordingly, it becomes difficult to make the apparatus with a small cost, which fact makes the apparatus unsuitable for mass-production. Furthermore, it is difficult for the arrangement to flexibly respond to the request to increase the number of channels.

SUMMARY OF THE INVENTION

The present invention is made in view of the above aspect, and the object of the present invention is to provide a crosspoint switch circuit which can easily and flexibly respond to a request of extensively increasing the channel size under a minimum space limitation, and which can be assembled and manufactured with ease. Another object of the present invention is to provide a switch cell electronic circuit which can offer a stable characteristic or the like for a point-to-multipoint communication or a ultrahigh bit-rate signal transmission.

According to the present invention, in order to attain the above object, there is provided a crosspoint switch circuit including a plurality of switch cells arrayed in a matrix fashion to form a matrix array, each of the switch cells being formed of a two-input and two-output type switch having a first and second input terminals and a first and second output terminals in which either of the input terminals is made connectable to any of the output terminals, and each of the switch cells being interconnected and controlled in each connecting status so that any one of input lines is made connectable to any of output lines, and also including external connecting means provided on each side of the matrix array so that the switch cells arrayed on each side of the matrix array are made connectable to switch cells arrayed on any side of a matrix array of another crosspoint switch which is to neighbor that crosspoint switch circuit. The crosspoint switch circuit is hereinafter sometimes referred to as a "unit switch circuit".

Further, according to the present invention, there is provided a crosspoint switch circuit array in which a plurality of the above crosspoint switch circuits are arrayed in a matrix form and interconnected one another by means of the above external connecting means. The crosspoint switch circuit array is hereinafter sometimes referred to as a "unit switch circuit group".

Each of the above crosspoint switch circuit constituting the crosspoint switch circuit array includes a plurality of switch cells arrayed in a matrix fashion to form a matrix array, each of the switch cells being formed of a two-input and two-output type switch having a first and second input terminals and a first and second output terminals in which either of the input terminals is made connectable to any of the output terminals, and each of the switch cells being interconnected and controlled in each connecting status so that any one of the input lines is made connectable to any of the output lines, and also includes external connecting means provided on each side of the matrix array so that the switch cells arrayed on each side of the matrix array are made connectable to switch cells arrayed on any side of a matrix array of another crosspoint switch which is to neighbor that crosspoint switch circuit.

According to the above present invention, since the external connecting means is provided on each side of the matrix array, the crosspoint switch circuit is made connectable to the switch cells arrayed on any side of the matrix array of another crosspoint switch which is to neighbor that crosspoint switch circuit. Therefore, the crosspoint switch circuit, or the unit switch circuit can be connected to one another to form a crosspoint switch circuit array of a planar arrangement so that the number of input lines (input highway) is increased upon necessity. In other words, the number of input lines can be increased for flexibly extending the circuit arrangement. Moreover, a complicated wiring such as a wiring in a three-dimensional manner becomes unnecessary. Therefore, it is possible to realize a crosspoint switch circuit or a crosspoint switch circuit array having a large number of input and output terminals very easily with low cost.

Further, according to the present invention, there is provided a crosspoint switch circuit array system in which a plurality of the above crosspoint switch circuit arrays are arrayed in a matrix form and interconnected to one another by means of the above external connecting means. The crosspoint switch circuit array system is arranged in a three-dimensional fashion. The crosspoint switch circuit array system may hereinafter be referred to as a "three-dimensionally arranged switch circuit".

Therefore, if the number of the crosspoint switch circuits is increased to increase the input and output terminals, the size of the crosspoint switch array can become too large. In this case, if the crosspoint switch circuit array composed of a number of crosspoint switch circuits are interconnected and arranged three-dimensionally, a crosspoint switch circuit array having a large number of input and output terminals having a simple arrangement can be realized.

In this case, the crosspoint switch circuit arrays may be interconnected to one another at each external connecting means through a flat cable to form the three-dimensionally arranged switch circuit.

According to the above arrangement, since the crosspoint switch circuit arrays are interconnected through the flat cable, complicated wiring work can be obviated. Therefore, the crosspoint switch circuit array or the crosspoint switch circuit array system can be assembled and manufactured with ease and hence it becomes possible to manufacture the crosspoint switch array system in a mass-production manner. As a result, it becomes possible to provide a crosspoint switch circuit having a large number of input and output terminals at an extremely low cost.

If the above crosspoint switch circuit (unit switch circuit) is composed of the m×n switch cells arrayed in a matrix form having m columns and n rows (m and n are each an integer larger than one), the external connecting means may be formed of input terminal circuits and output terminal circuits having arrangements as descried in the following items (1) to (16).

(1) n−1 first output terminal circuits each for making the first output terminal of the switch cell positioned at the jth ($1 \leq j \leq n-1$) column of a first row of the matrix connectable to the second input terminal of the switch cell positioned at the j+1th column of the mth row of the matrix of a first different crosspoint switch circuit.

(2) n−1 first input terminal circuits for making the first input terminal of the switch cell positioned at j+1th column of the first row of the matrix connectable to the second output terminal of the switch cell positioned at jth column of the mth row of the matrix of the first different crosspoint switch circuit.

(3) n−1 second output terminal circuits for making the second output terminal of the switch cell positioned at jth column of the mth row of the matrix connectable to the first input terminal of the switch cell positioned at j+1th column of a first row of the matrix of a second different crosspoint switch circuit.

(4) n−1 second input terminal circuits for making the second input terminal of the switch cell positioned at the j+1th column of the mth row of the matrix connectable to the first output terminal of the switch cell positioned at the jth column of the first row of the matrix of the second different crosspoint switch circuit.

(5) m−1 third input terminal circuits for making the second input terminal of the switch cell positioned at the first column of the ith ($1 \leq i \leq m-1$) row of the matrix connectable to the first output terminal of the switch cell positioned at nth column of an i+1th row of the matrix of a third different crosspoint switch circuit.

(6) m−1 fourth input terminal circuits for making the first input terminal of the switch cell positioned at the first column of the i+1th row of the matrix connectable to the second output terminal of the switch cell positioned at nth column of the ith row of the matrix of the third different crosspoint switch circuit.

(7) m−1 third output terminal circuits for making the second output terminal of the switch cell positioned at the nth column of the ith row of the matrix connectable to the first input terminal of the switch cell positioned at first column of an i+1th row of the matrix of a fourth different crosspoint switch circuit.

(8) m−1 fourth output terminal circuits for making the first output terminal of the switch cell positioned at the nth column of the i+1th row of the matrix connectable to the second output terminal of the switch cell positioned at the first column of the ith row of the matrix of the fourth different crosspoint switch circuit.

(9) A single fifth input terminal circuit connectable to the first output terminal of the switch cell positioned at the nth column of the first row of the matrix of the third different crosspoint switch circuit.

(10) A single fifth output terminal circuit connected to the fifth input terminal circuit and connectable to the second input terminal of the switch cell positioned at the first column of the nth row of the matrix of the first different crosspoint switch circuit.

(11) A single sixth input terminal circuit connectable to the second output terminal of the switch cell positioned at the nth column of the mth row of the matrix of the third different crosspoint switch circuit.

(12) A single sixth output terminal circuit connected to the sixth input terminal circuit and connectable to the first input terminal of the switch cell positioned at the first column of the first row of the matrix of the second different crosspoint switch circuit.

(13) A single seventh input terminal circuit for making the first input terminal of the switch cell positioned at the first column of the first row of the matrix connectable to the sixth output terminal circuit of the first different crosspoint switch circuit.

(14) A single eighth input terminal circuit for making the second input terminal of the switch cell positioned at the first column of the mth row of the matrix connectable to the fifth output terminal circuit of the second different crosspoint switch circuit.

(15) A single seventh output terminal circuit for making the first output terminal of the switch cell positioned at the nth column of the first row of the matrix connectable to the fifth input terminal circuit of the fourth different crosspoint switch circuit.

(16) A single eighth output terminal circuit for making the second output terminal of the switch cell positioned at the nth column of the mth row of the matrix connectable to the sixth input terminal circuit of the fourth different crosspoint switch circuit.

If the external connecting means is formed of the above-described first to eighth input terminal circuits and first to eighth output circuits, a crosspoint switch circuit can be positively connected with at maximum four different crosspoint switch circuits neighboring that crosspoint switch circuit in a planar arrangement.

The crosspoint switch circuit may be arranged such that if the crosspoint switch circuit is not connected with the first different crosspoint switch circuit, then the fifth output terminal circuit and the seventh input terminal circuit on the side of the first input terminal of the switch cell positioned at the first column of the first row are connected to each other while the first output terminal circuit on the side of the first output terminal of the switch cell positioned at the jth column of the first row and the first input terminal circuit on the side of the first input terminal of the switch cell positioned at the j+1th column of the first row are connected to each other.

According to the above arrangement, if the crosspoint switch circuit is not connected with another crosspoint circuit at the side of the first row (for example, a unit switch circuit positioned at the first row among the unit switch circuit group composed of the plurality of crosspoint switch circuits arrayed in a matrix form), then the fifth output terminal circuit and the seventh input terminal circuit are connected to each other while the first output terminal circuit and the first input terminal circuit are connected to each other. Therefore, the first input terminal and the first output terminal of the switch cell positioned on the first row are connected to each other, with the result that a signal transmission path is secured for a signal inputted to the switch cell positioned on the first row, guaranteeing a normal input and output highway connection.

The crosspoint switch circuit may be arranged such that if the crosspoint switch circuit is not connected with the second different crosspoint switch circuit, then the sixth output terminal circuit and the eighth input terminal circuit on the side of the second input terminal of the switch cell positioned at the first column of the mth row are connected to each other while the second output terminal circuit on the side of the second output terminal of the switch cell positioned at the jth column of the mth row and the second input terminal circuit on the side of the second input terminal of the switch cell positioned at the j+1th column of the mth row are connected to each other.

According to the above arrangement, if the crosspoint switch circuit is not connected with another crosspoint circuit at the side of the mth row (for example, a unit switch circuit positioned at the mth row among the unit switch circuit group composed of the plurality of crosspoint switch circuits arrayed in a matrix form), then the sixth output terminal circuit and the eighth input terminal circuit are connected to each other while the second output terminal circuit and the second input terminal circuit are connected to each other. Therefore, the second input terminal and the second output terminal of the switch cell positioned on the mth row are connected to each other, with the result that a signal transmission path is secured for a signal inputted to the switch cell positioned on the mth row, guaranteeing a normal input and output highway connection.

The crosspoint switch circuit may be arranged such that the third to sixth input terminal circuits are provided on one side corresponding to the first column of the matrix array, the third, fourth, seventh and eighth output terminal circuits are provided on one side corresponding to the nth column of the matrix array, the first and seventh input terminal circuits and the first and fifth output terminal circuits are provided on one side corresponding to the first row of the matrix array, and the second and eighth input terminal circuits and the second and sixth output terminal circuits are provided on one side corresponding to the mth row of the matrix array.

According to the above arrangement, a crosspoint switch circuit can be connected with at maximum four other crosspoint switch circuits which are to neighbor that crosspoint switch circuit at each side in a planar arrangement. This arrangement is effectively utilized particularly in a case where the switch cell is formed of an electronic circuit, because wiring work and circuit integration can be carried out with ease.

If the switch cell is formed of the electronic circuit as described above, the following advantages can be obtained.

① Since signal distribution can be carried out with ease, a stable point-to-multipoint connection can be realized with ease.

② Since the switch cells can be integrated on a semiconductor chip, circuit miniaturization can be remarkably progressed as compared with the switch cells using an optical waveguide such as an optical switch or the like.

③ It is not necessary to provide an external circuit such as a temperature controller for each switch cell unlike the optical switch using the optical waveguide. Therefore, the switch can be remarkably small-sized and the electric consumption thereof can also be remarkably reduced.

④ Since the switch cell can be electrically connected to an external circuit (e.g., another switch cell, an output terminal circuit, an input terminal circuit), it is not necessary to arrange a complicated optical coupling with an optical fiber or the like.

Each of the above input terminal circuits may be provided on one side of the first row while each of the above output terminal circuits may be provided on one side of the nth row of the matrix array. In this case, connection between the unit switch cells in a three-dimensional fashion may be unavoidable. However, the bending angle of wires of the input and output terminals within the unit switch cell can be made small. Therefore, the above arrangement is particularly effective if the switch cell is formed of an optical circuit. That is, influence caused from an optical loss due to the bending of the wire (e.g., optical waveguide or the like) can be suppressed to a minimum level.

Meanwhile, if the above switch cell is formed of an electronic circuit (such as the switch cell electronic circuit of the present invention), the switch cell may be formed of a first electronic switch unit for electrically connecting the first input terminal to either or both of the first and second output terminals and a second electronic switch unit for electrically connecting the second input terminal to either or both of the first and second output terminals.

According to the above arrangement, the following connections of items of ① to ④ can be realized. Therefore, great contribution can be expected for realizing a multifunctional crosspoint switch circuit having a flexible utility.

① cross connection (connection between the first input terminal and the second output terminal, connection between the second input terminal to the first output terminal).

② bar connection (connection between the first input terminal and the first output terminal, connection between the second input terminal to the second output terminal).

③ point-to-multipoint connection (connection from the first input terminal to first and second output terminals).

④ point-to-multipoint connection (connection from the second input terminal to first and second output terminals).

In more concretely, for example, the switch cell may include a first input circuit having a first transistor with the base grounded and a first load resistor connected to a collector of the first transistor, the emitter of the first transistor being provided as the first input terminal, a second input circuit having a second transistor with the base grounded and a second load resistor connected to a collector of the second transistor, the emitter of the second transistor being provided as the second input terminal, and first to fourth output current switch circuits each having a third and fourth transistors with respective emitters connected to each other to form a differential arrangement, the first and second output current switch circuits forming the first electronic switch unit while the third and fourth output current switch circuits forming the second electronic switch unit. The switch cell may be arranged such that the third transistor of the first output current switch circuit and the fourth transistor of the third output current switch circuit are connected in parallel at each collector to form the first output terminal, while the third transistor of the second output current switch circuit and the fourth transistor of the fourth output current switch circuit are connected in parallel at each collector to form the second output terminal, the respective fourth transistors of the first and second output current switch circuits are connected in parallel at each base to the first load resistor of the first input circuit, the respective third transistors of the third and fourth output current switch circuits are connected in parallel at each base to the second load resistor of the second input circuit, and that currents flowing through the first to fourth output current switch circuits are controlled, whereby the connecting status representing the connection between the first and second input terminals and the first and second output terminals is changed.

Further, the switch cell may further include first to fourth current source circuits each having a fifth transistor of which collector is connected to one of the first to fourth output current switch circuits, and of which emitter is connected to a third load resistor, wherein the base potential of each fifth transistor of the current source circuit is independently controlled, whereby currents flowing through the first to fourth output current switch circuits are controlled.

Further, the above switch cell may include a third input current switch circuit, serving as the first electronic switch, having sixth and seventh transistors of which emitters are connected in parallel to form the first input terminal, a fourth input current switch circuit, serving as the second electronic switch, having eighth and ninth transistors of which emitters are connected in parallel to form the second input terminal, a fourth load resistor connected to each collector of the sixth and eighth transistors in a parallel fashion, a fifth load resistor connected to each collector of the seventh and ninth transistors in a parallel fashion, a fifth output current switch circuit having tenth and eleventh transistors connected to each other through the respective emitters to form a differential arrangement, the collector of the tenth transistor being provided as the first output terminal, and the base of the eleventh transistor being connected to the fourth load resistor, and a sixth output current switch circuit having twelfth and thirteenth transistors connected to each other through the respective emitters to form a differential arrangement, the collector of the twelfth transistor being provided as the second output terminal, and the base of the thirteenth transistor being connected to the fifth load resistor. The switch cell may be arranged such that each base potential of the sixth to ninth transistors is independently controlled so that the connecting status representing the connection between the first and second input terminals and the first and second output terminals can be changed.

As described above, if the switch cell is implemented to have a couple of output current switch circuits each having transistors in correspondence with each of the output terminals, the switch cell can have a signal amplifying function. Therefore, the signal level decrease can be suppressed at a minimum level. Accordingly, if a number of crosspoint switch circuits are arranged to form a large-sized crosspoint switch circuit system and a signal is supplied thereto, it can be expected that the signal level or the waveform of the signal can be satisfactorily maintained between the input and output highway. Further, since the above-mentioned connection can be changed by switching the electric current signal, the circuit can be operated at a high speed with stability. Furthermore, a number of the crosspoint switch circuits can be fabricated on a small chip in an integrated fashion, great contribution can be expected on characteristic stability against a high rate signal, small-sizing of the circuit system, the characteristic stability of the crosspoint switch circuit, and small-sizing thereof.

In this case, if the first input terminal of the subject switch cell and the second output terminal of another switch cell (alternatively, the second input terminal of the subject switch cell and the first output terminal of another switch cell) are connected to each other, a cascode interface circuit is formed. Therefore, durability against capacitive coupling or the like due to the wiring between the switch cells is improved, leading to more stable characteristic against high rate signal transmission.

If the input (current switch) circuit, each of the input terminals and each of the output terminals are formed into a differential arrangement, the following advantages can be obtained.

① Influence deriving from switching noise can be suppressed.

② The switching circuits can be fabricated into semiconductor integrated circuits with ease.

③ Stability against fluctuation in the temperature or the power supply voltage can be improved.

④ When a high bit-rate signal is supplied thereto to drive the circuit at high speed, the power supply current amount within the circuit can be prevented from fluctuation. Thus, the circuit can be operated at a high speed with stability, and it is possible to suppress influence on other circuits.

⑤ The multilevel wiring between the switch cells becomes a multilevel wiring formed of a signal wiring of a differential arrangement. Thus, crosstalk between the signals transmitted at the multilevel wiring point can be more suppressed.

Further, the above switch cell may be arranged to have a first current switch control circuit for allowing a current to be flowed in only one of the first and third output current switch circuits, and a second current switch control circuit for allowing a current to be flowed in only one of the second and fourth output current switch circuits.

According to the above arrangement, the current flowing in each of the four sets of output current switch circuits is controlled by two sets of the current switch control circuits. Therefore, current switching of the output current switch circuit can be carried out at each couple of output current switch circuit, and hence erroneous switching operation can be prevented from occurring.

Further objects and advantages of the present invention will be apparent from the following description which is given with reference to the accompanying drawings wherein preferred embodiments of the present invention are clearly shown.

DESCRIPTION OF THE PREFERRED EMBODIMENTS

Embodiments of the present invention will hereinafter be described with reference to drawings.

(A) Description of Crosspoint Switch Circuits.

Figure 1:
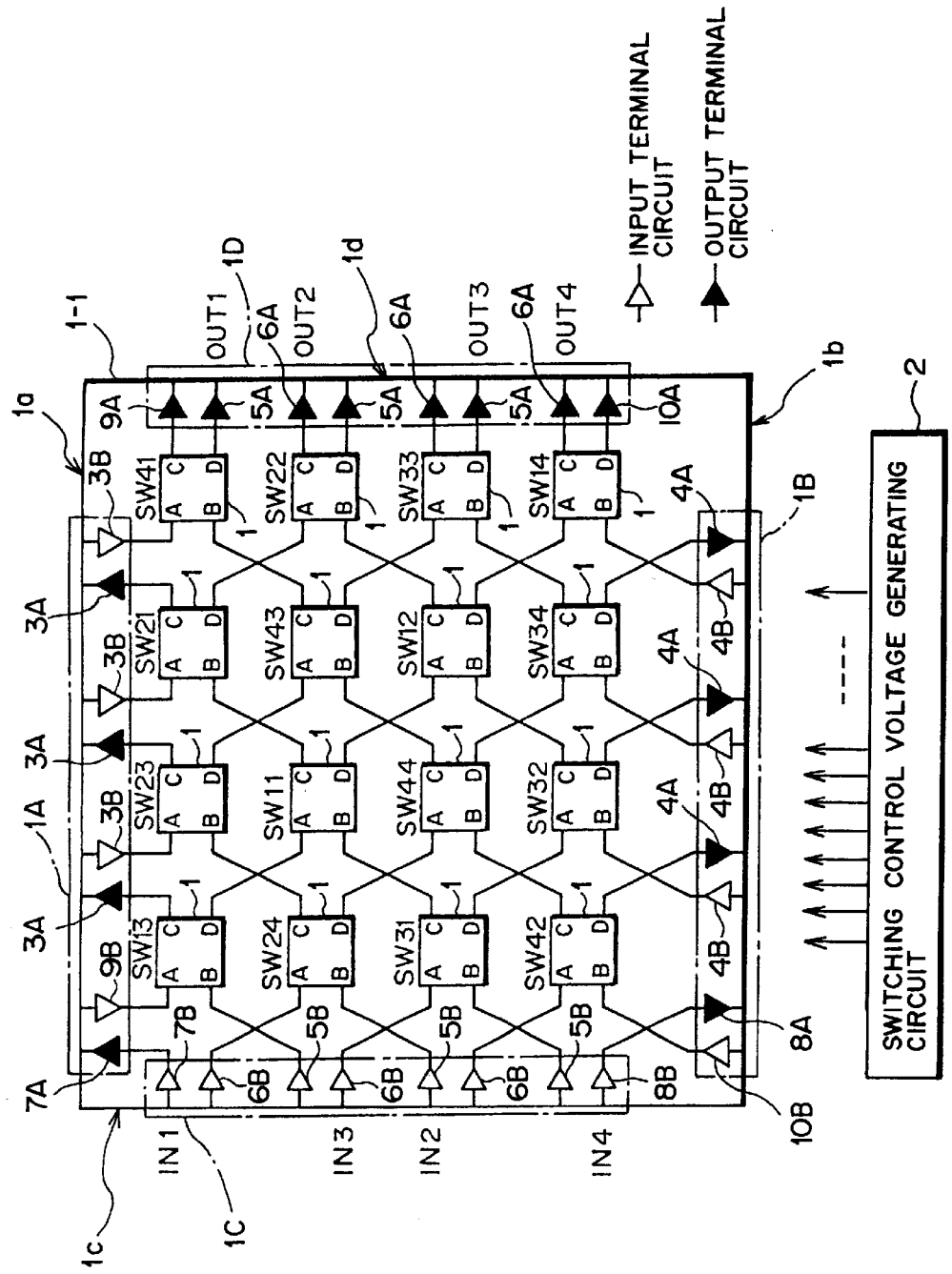
FIG. 1 is a block diagram showing an arrangement of a crosspoint switch circuit as one embodiment of the present invention.

FIG. 1 is a block diagram showing an arrangement of a crosspoint switch circuit as one embodiment of the present invention. As shown in FIG. 1, the crosspoint switch circuit 1-1 of the present embodiment is formed of a plurality of (in this case, m×n=4×4=16) switch cells 1. These switch cells 1 [SWxy (1≦x≦4, 1≦y≦4)] are arrayed to form a matrix having four rows and four columns.

Each of the switch cells 1 is a two-input and two-output type switch having two input terminals A and B (first and second input terminals) and two output terminals C and D (first and second input terminals). The switch cell 1 is constructed so that any of the input terminals A and B is connectable to any of the output terminals C and D. In more concretely, as will be described in an item of "(B) Description of switch cell" later, the switch cell is formed of an electronic circuit capable of switching among the following four kinds of connecting statuses.

Figure 9A:
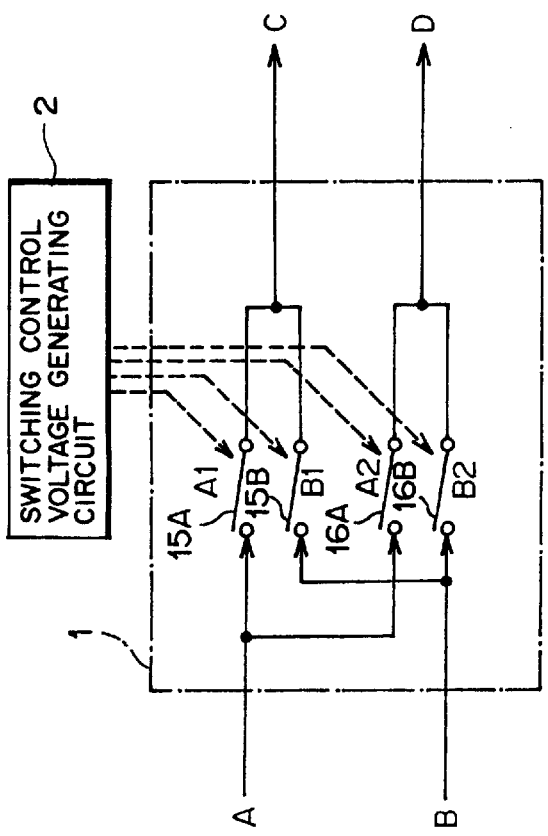
FIG. 9A is a block diagram useful for explaining the principle of the operation of the arrangement of the switch cell (switch cell electronic circuit) as one embodiment of the present invention.
Figure 9C:
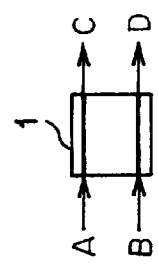
FIG. 9B to FIG. 9E are block diagrams each schematically showing a connecting status of the switch cell shown in FIG. 9A.
Figure 9B:
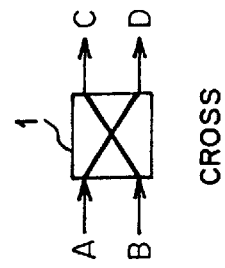

(1) cross connection [connection between the terminals A and D and connection between the terminals B and C: see FIG. 9B]

(2) bar connection [connection between the terminals A and C and connection between the terminals B and D: see FIG. 9C]

(3) point-to-multipoint connection at the terminal A [connection between the terminal A and the terminals C and D: see FIG. 9 (D)]

(4) point-to-multipoint connection at the terminal B [connection between the terminal B and the terminals C and D: see FIG. 9 (E)]

Similarly to the above-described optical switch (PI-LOSS type optical switch), each of the switch cells 1 undergoes control of a control voltage generating circuit 2, whereby switching operation of the switch cell 1 (SWxy) is controlled (one switch cell SWxy is controlled to have the bar connecting status). Thus, any of the input highway (INx) and any of the output highway (OUTy)) can be interconnected as shown in FIG. 1.

That is, the output terminal D of the switch cell 1 positioned at ith row of jth column of the above matrix (in this case, 1≦i≦3, 1≦j≦3), is connected to the input terminal A of the switch cell SWxy positioned at i+1th row of jth column. The output terminal C of the switch cell SWxy positioned at i+1th row of jth column is connected to the input terminal B of the switch cell 1 positioned at ith row of j+1th column.

Figure 20:
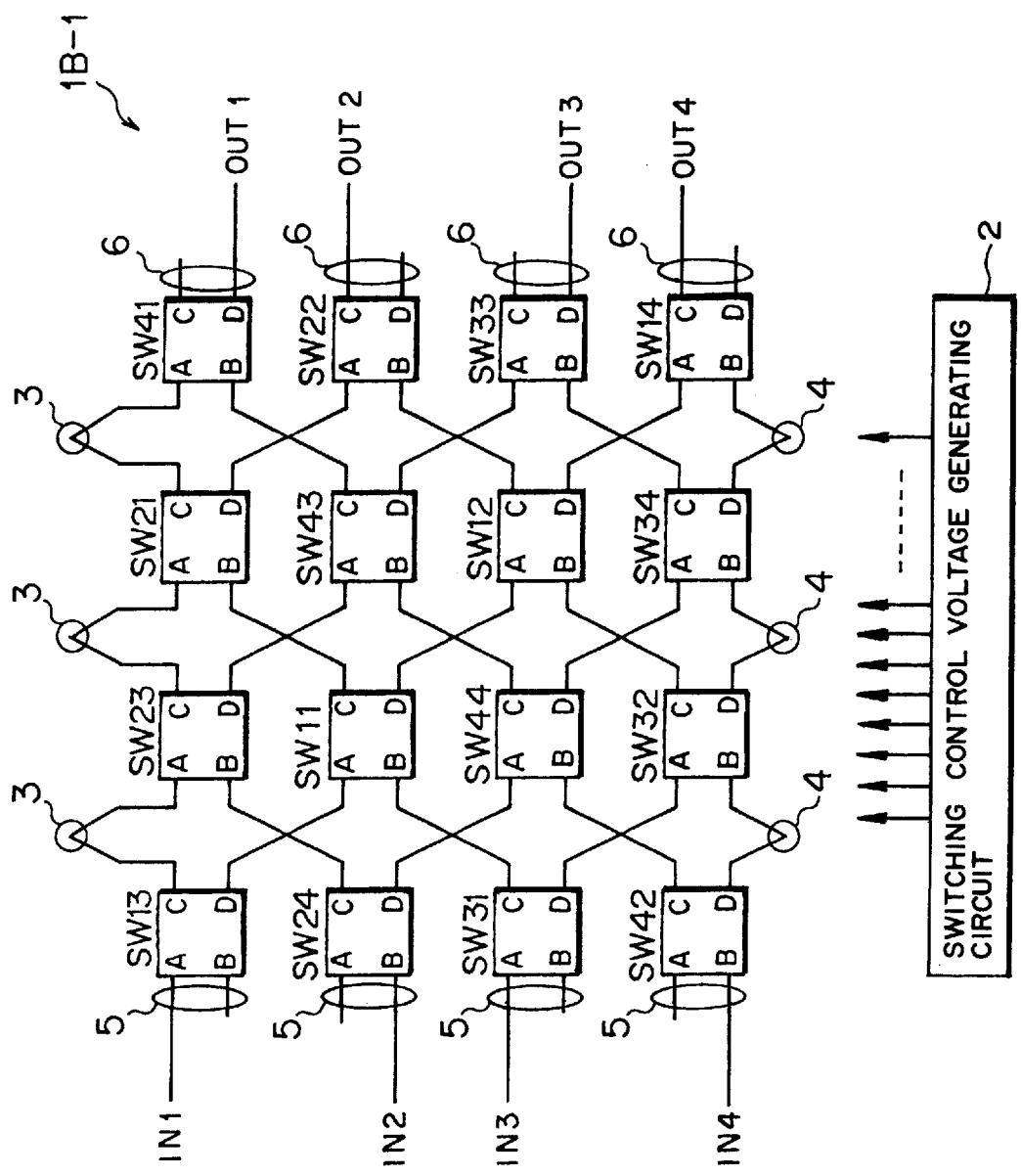
FIG. 20 is a block diagram showing a crosspoint switch circuit formed of an electronic circuit in which an arrangement equivalent to a PI-LOSS type optical switch is realized.
Figure 21:
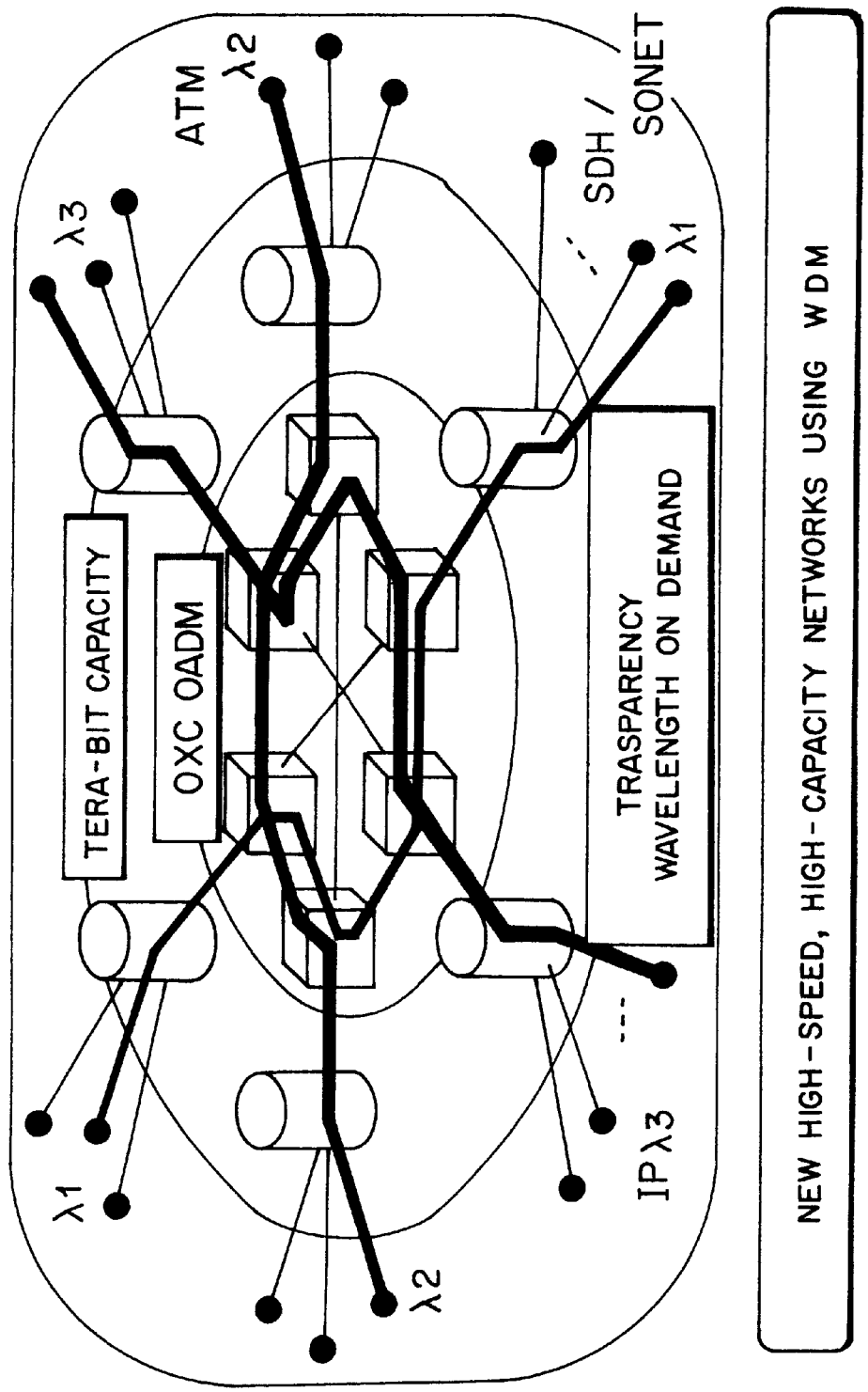
FIG. 21 is a diagram schematically showing one example of a photonic network employing a WDM technology having a large capacity and capable of transmitting an ultra-high bit-rate signal.
Figure 22:
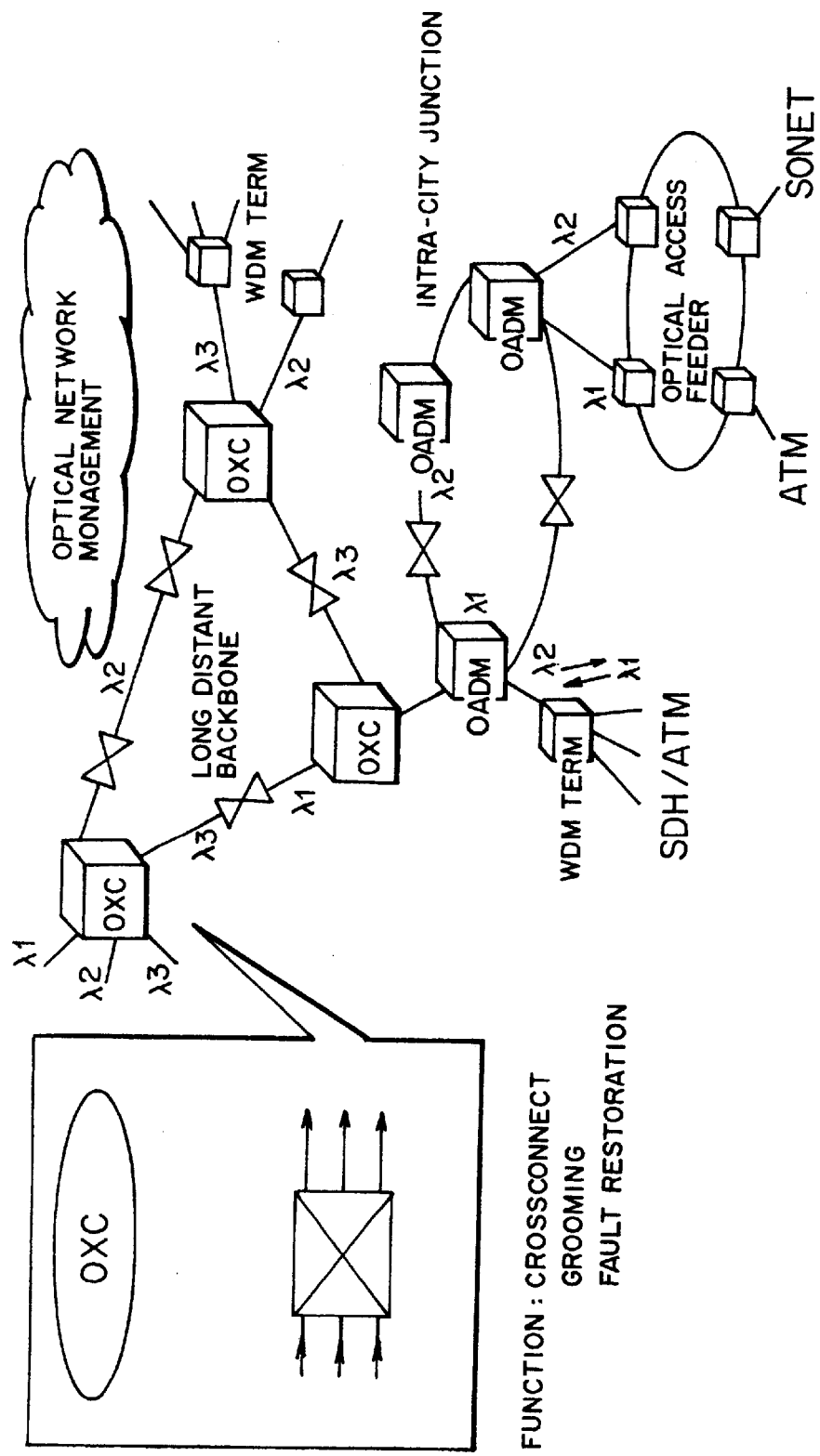
FIG. 22 is a diagram schematically showing one example of an optical network in which illustration thereof is aiming at a cross-connect apparatus.
Figure 23:
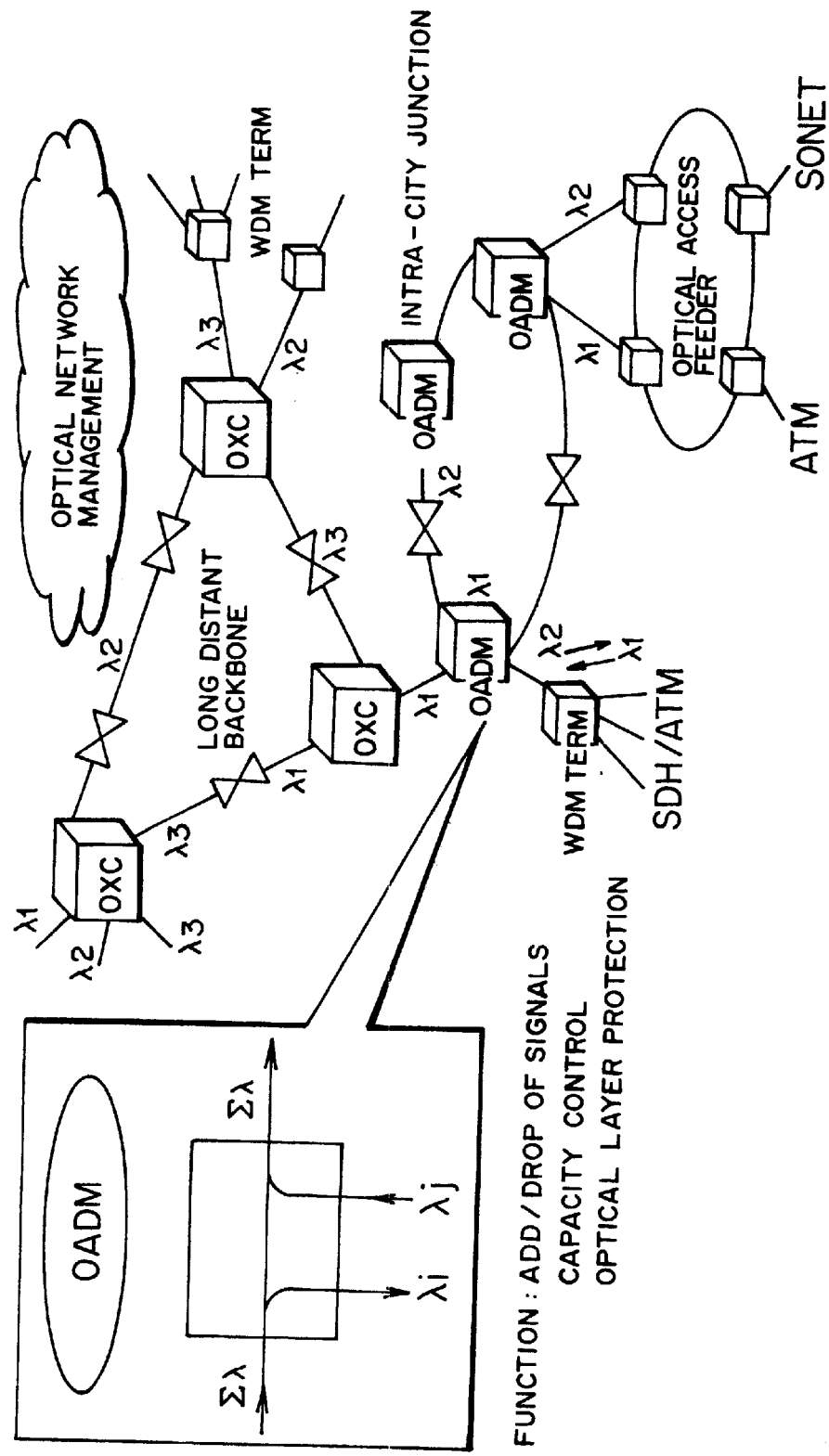
FIG. 23 is a diagram schematically showing one example of an optical network in which illustration thereof is aiming at an OADM.
Figure 24:
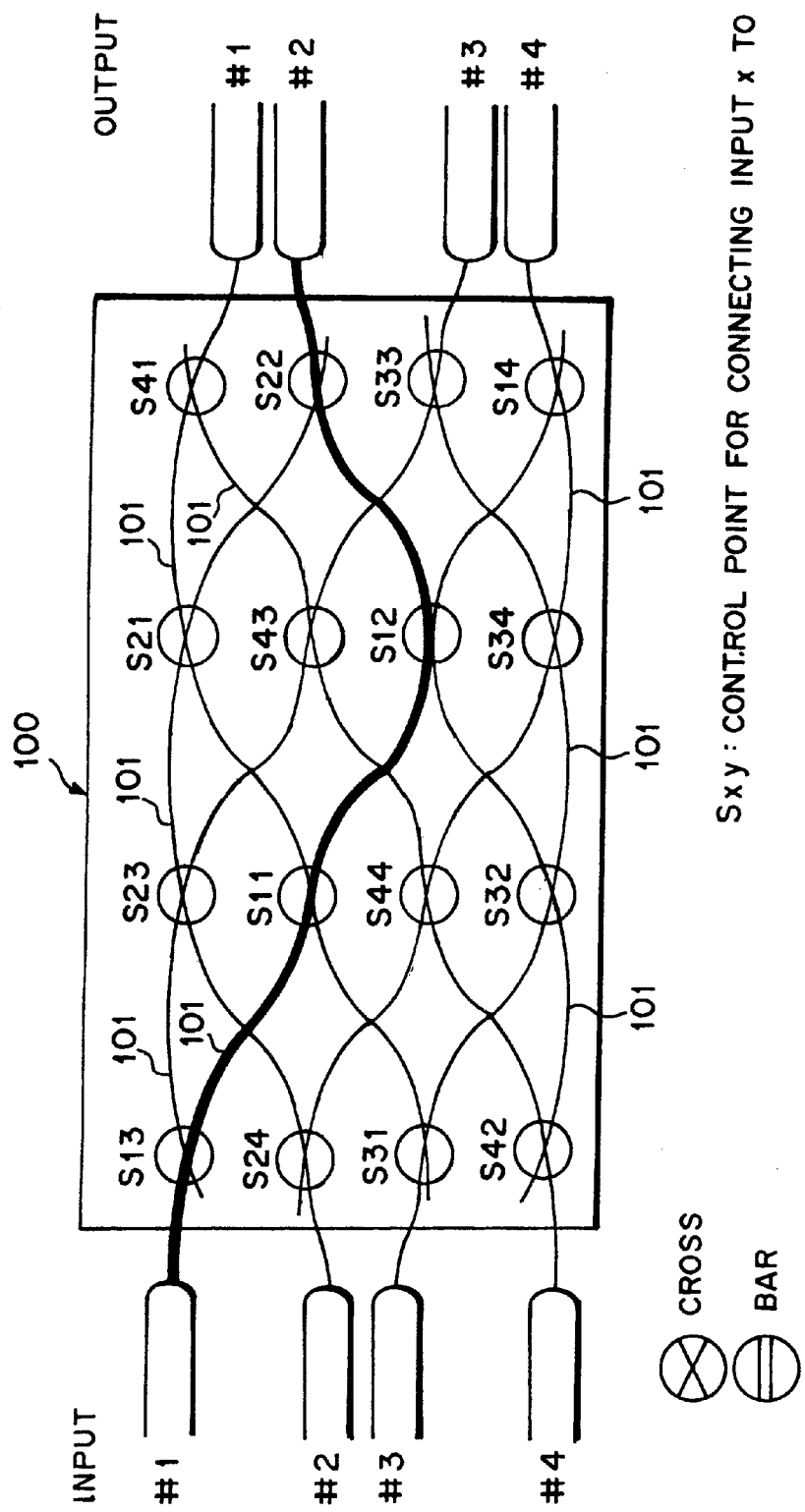
FIG. 24 is a block diagram showing one example of a PI-LOSS type optical switch.
Figure 25:
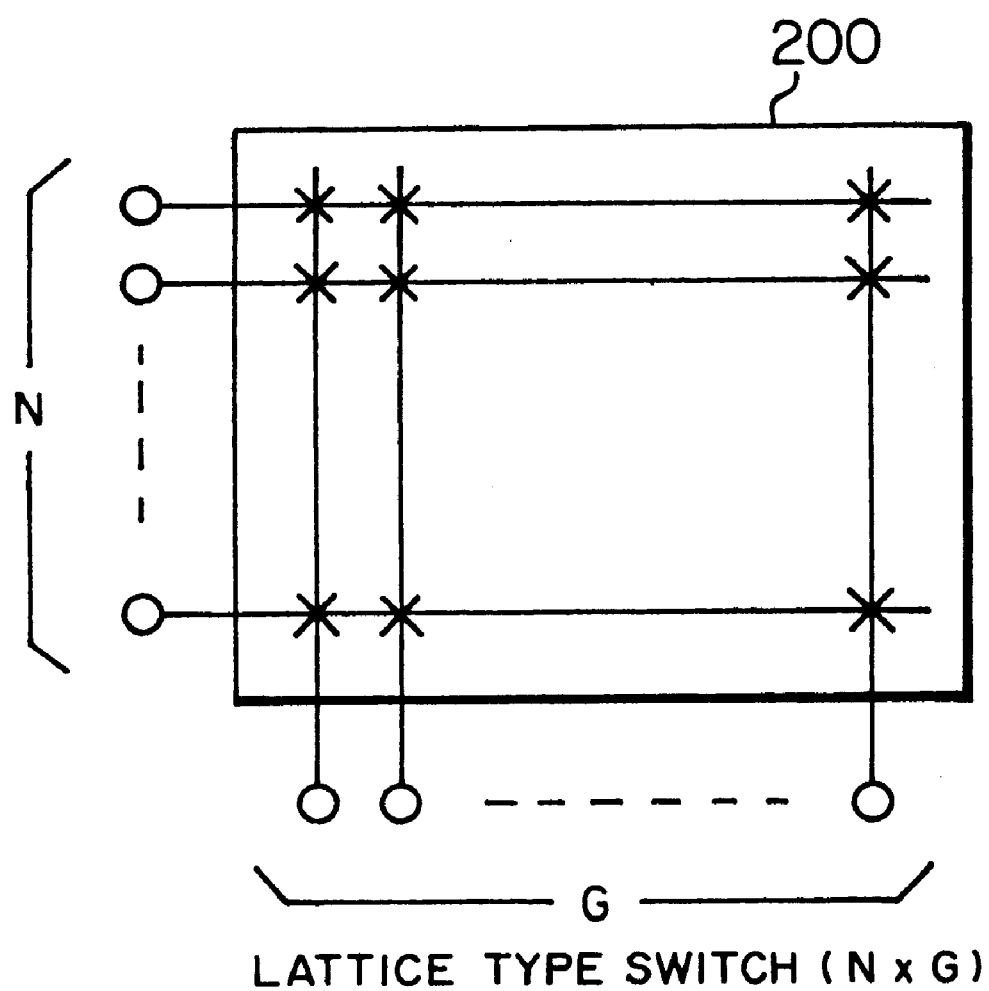
FIG. 25 is a block diagram showing one example of an electric switch.
Figure 26:
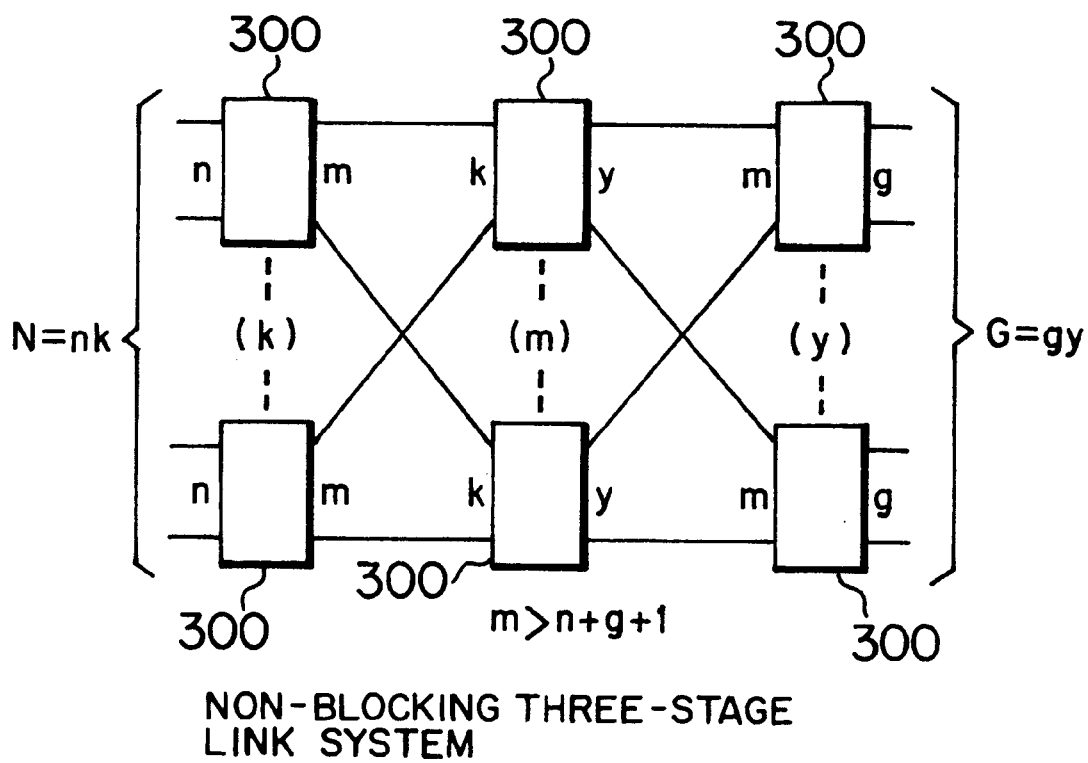
FIG. 26 is a diagram showing a crosspoint switch circuit with a multistage (three-stage) link arrangement.

According to the conventional arrangement, as for example shown at reference numeral 3 in FIG. 20, the output terminal C of the switch cell 1 positioned at first row of jth column shall be connected to the input terminal A of the switch cell 1 positioned at first row of j+1th column. However, according to the present embodiment, as shown in FIG. 1, the output terminal C of the switch cell 1 positioned at first row of jth column is connected to an output terminal circuit 3A while the input terminal A of the switch cell 1 positioned at first row of j+1th column is connected to an input terminal circuit 3B.

Further, according to the conventional arrangement, as for example shown at reference numeral 4 in FIG. 20, the output terminal D of the switch cell 1 positioned at fourth row of jth column shall be connected to the input terminal B of the switch cell 1 positioned at first row of j+1th column. However, according to the present embodiment, as shown in FIG. 1, the output terminal D of the switch cell 1 positioned at fourth row of jth column is connected to an output terminal circuit 4A while the input terminal B of the switch cell 1 positioned at fourth row of j+1th column is connected to an input terminal circuit 4B.

Further, according to the conventional arrangement, as for example shown at reference numeral 5 in FIG. 20, one of the input terminals A and B of each switch cell 1 (SW13, SW24, SW31, SW42) positioned at first row shall be connected to the input highway (INx)(the other terminal becomes a vacant terminal). However, according to the present embodiment, as shown in FIG. 1, there is provided a circuit configuration including input terminal circuits 5B to 10B, and output terminal circuits 7A, 8A connected to the input terminal circuits 7B, 8B.

Further, according to the conventional arrangement, as for example shown at reference numeral 6 in FIG. 20, one of the output terminals C and D of each switch cell 1 (SW41, SW22, SW33, SW14)positioned at fourth row shall be connected to the output highway (OUTy)(the other terminal becomes a vacant terminal). However, according to the present embodiment, as shown in FIG. 1, there is provided a circuit configuration including output terminal circuits 5A, 6A, 9A, and 10A.

The above output terminal circuits (first output terminal circuits) 3A (total n−1=3) make the output terminal C of each switch cell 1 (SW13, SW23, SW21) positioned at first row of the jth column connectable to the input terminal B of each switch cell 1 (SW32, SW34, SW14) positioned at fourth row of the j+1th column of another (first) crosspoint switch circuit 1-1 disposed adjacent to the side 1*a* of the subject crosspoint switch circuit.

The above input terminal circuits (first input terminal circuits) 3B (total n−1=3) make the input terminal A of each switch cell 1 (SW23, SW21, SW41) positioned at the first row of the j+1th column connectable to the output terminal D of each switch cell 1 (SW42, SW32, SW34) positioned at fourth row of jth column of the above different (first) crosspoint switch circuit 1-1.

The output terminal circuits (second output terminal circuits) 4A (total n−1=3) make the output terminal D of each switch cell 1 (SW42, SW32, SW34) positioned at the last row of jth column connectable to the input terminal A of each switch cell 1 (SW23, SW21, SW41) positioned at the first row of the j+1th column of a second different crosspoint switch circuit 1-1 disposed adjacent to the side 1*b* of the subject crosspoint switch circuit.

The above input terminal circuits (second input terminal circuits) 4B (total n−1=3) make the input terminal B of each switch cell 1 (SW32, SW34, SW14) positioned at the last row of the j+1th column connectable to the output terminal C of each switch cell 1 (SW13, SW23, SW21) positioned at first row of the jth column of the above second different crosspoint switch circuit 1-1.

The input terminal circuits (third output terminal circuits) 5B (total m−1=3) make the output terminal C of each switch cell 1 (SW13, SW24, SW31) positioned at the ith row of first column connectable to the output terminal C of each switch cell 1 (SW22, SW33, SW14) positioned at the i+1th row of nth column (last column) of another (third) crosspoint switch circuit 1-1 disposed adjacent to the side 1*c* of the subject crosspoint switch circuit.

The input terminal circuits (fourth input terminal circuits) 6B (total m−1=3) make the input terminal A of each switch cell 1 (SW24, SW31, SW42) positioned at the i+1th row of first column connectable to the output terminal D of each switch cell 1 (SW41, SW22, SW33) positioned at the ith row of the last column of the above third different crosspoint switch circuit 1-1.

The output terminal circuits (third output terminal circuits) 5A (total m−1=3) make the output terminal D of each switch cell 1 (SW41, SW22, SW33) positioned at the ith row of the last column connectable to the input terminal A of each switch cell 1 (SW24, SW31, SW42) positioned at the i+1th row of the first column of a another (fourth) crosspoint switch circuit 1-1 disposed adjacent to the side 1*d* of the subject crosspoint switch circuit.

The output terminal circuits (fourth output terminal circuits) 6A (total m−1=3) make the output terminal C of each switch cell 1 (SW22, SW33, SW14) positioned at the i+1th row of the last column connectable to the input terminal B of each switch cell 1 (SW13, SW24, SW31) positioned at ith row of the first column of the above fourth different crosspoint switch circuit 1-1.

The input terminal circuit (fifth input terminal circuit) 7B (one) is connectable to the output terminal C of the switch cell 1 (SW41) positioned at the first row of the last column of the third crosspoint switch circuit 1-1 disposed adjacent to the side 1c of the subject crosspoint switch circuit, while the output terminal circuit (fifth output terminal circuit) 7A (one) is connected to the input terminal circuit 7B and connectable to the input terminal circuit B of the switch cell 1 (SW42) positioned at the last row of the first column of the first crosspoint switch circuit 1-1 disposed adjacent to the side 1a of the subject crosspoint switch circuit.

The input terminal circuit (sixth input terminal circuit) 8B (one) is connectable to the output terminal D of the switch cell 1 (SW14) positioned at the last row of the last column of the third crosspoint switch circuit 1-1 disposed adjacent to the side 1c of the subject crosspoint switch circuit, while the output terminal circuit (sixth output terminal circuit) 8A (one) is connected to the input terminal circuit 8B and connectable to the input terminal circuit A of the switch cell 1 (SW13) positioned at the first row of the first column of the second crosspoint switch circuit 1-1 disposed adjacent to the side 1b of the subject crosspoint switch circuit.

The input terminal circuit (seventh input terminal circuit) 9B (one) makes the input terminal A of the switch cell 1 (SW13) positioned at the first row of the first column connectable to the output terminal circuit 8A of the first crosspoint switch circuit 1-1 disposed adjacent to the side 1a of the subject crosspoint switch circuit, while the input terminal circuit (eighth input terminal circuit) 10B (one) makes the input terminal B of the switch cell 1 (SW42) positioned at the last row of the first column connectable to the output terminal circuit 7A of the second crosspoint switch circuit 1-1 disposed adjacent to the side 1b of the subject crosspoint switch circuit.

The output terminal circuit (seventh output terminal circuit) 9A (one) makes the output terminal C of the switch cell 1 (SW41) positioned at the first row of the nth column connectable to the input terminal circuit 7B of the fourth crosspoint switch circuit 1-1 disposed adjacent to the side 1d of the subject crosspoint switch circuit, while the output terminal circuit (eighth output terminal circuit) 10A (one) makes the output terminal D of the switch cell 1 (SW14) positioned at the last row of the last column connectable to the input terminal circuit 8B of the fourth crosspoint switch circuit 1-1 disposed adjacent to the side 1d of the subject crosspoint switch circuit.

That is, the output terminal circuits 3A to 10A and the input terminal circuits 3B to 10B constitute the external connecting means 1A to 1D which make switch cell 1 positioned on each side of the matrix array connectable to the switch cell 1 positioned on one side of the matrix array of the switch cells 1 arrayed to form a matrix in the another neighboring crosspoint switch circuit 1-1.

According to the above embodiment, as shown in FIG. 1, the input terminal circuits 5B to 8B are provided on the side 1c (one side forming the first column of the matrix array), the output terminal circuits 5A, 6A, 9A and 10A are provided on the side 1d (one side forming the last column of the matrix array), the input terminal circuits 3B and 9B and the output circuits 3A and 7A are provided on the side 1a (one side forming the first row of the matrix array), and the input terminal circuits 4B and 10B and the output circuits 4A and 8A are provided on the side 1b (one side forming the last row of the matrix array).

Figure 2:
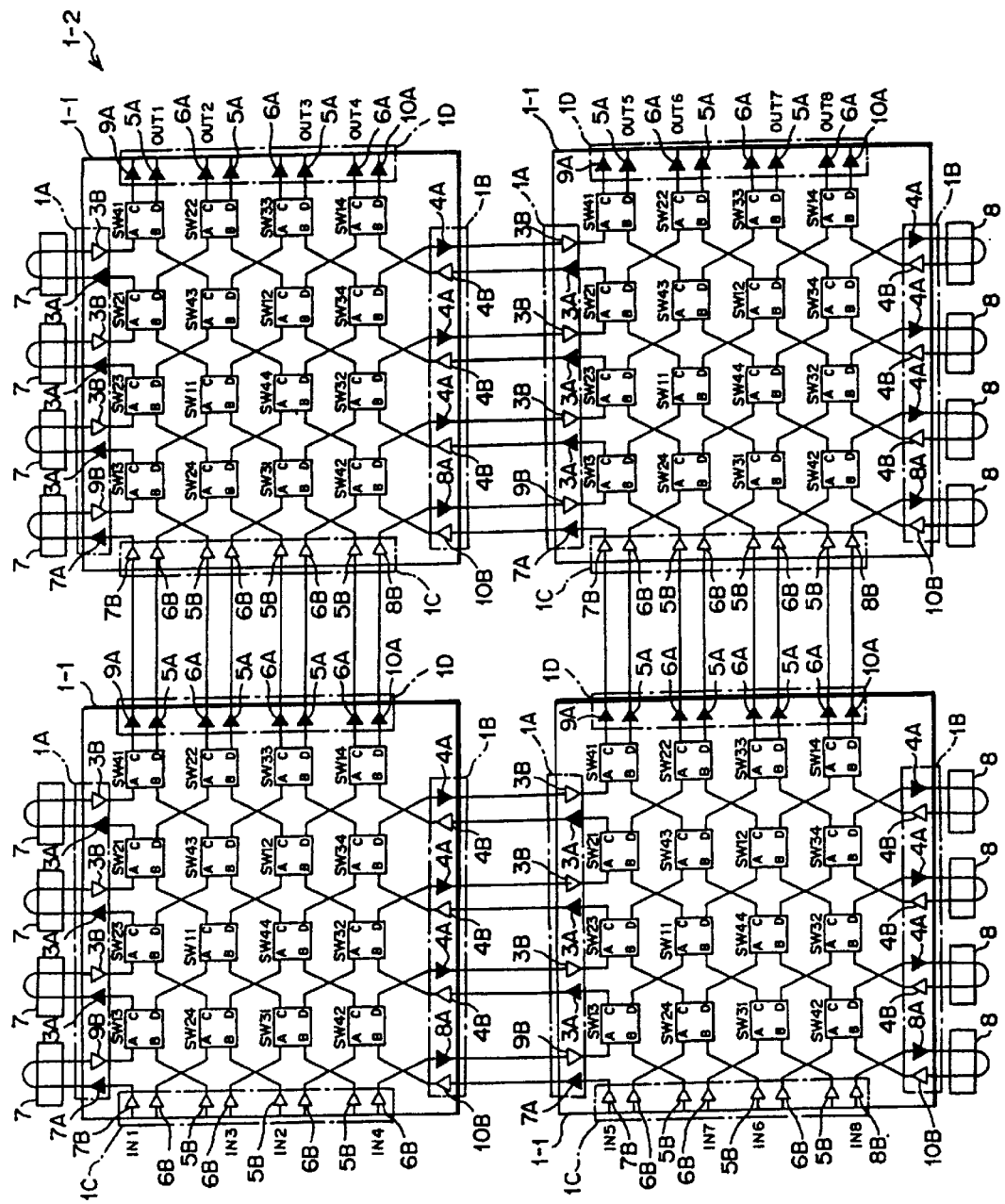
FIG. 2 is a block diagram showing an arrangement in which four crosspoint switch circuits each shown in FIG. 1 are interconnected to one another in a planar fashion.

Since the output terminal circuits 3A to 10A and the input terminal circuits 3B to 10B are arranged as described above, the crosspoint switch circuit 1-1 can be positively connected, in a planar fashion, with at maximum four other crosspoint switch circuits which are brought to the four sides 1a to 1d of the subject crosspoint switch circuit. For example, four crosspoint switch circuits 1-1 shown in FIG. 1 (the circuit may hereinafter be referred to as a unit switch circuit 1-1) may be prepared, and the four unit switch circuit 1-1 are arrayed to form a matrix having two row and two columns as shown in FIG. 2. Then, the unit switch circuits adjacent to each other are interconnected to each other through the external connecting means 1A to 1D (that is, the neighboring unit switch circuits are connected to each other through each external connecting means 1A and 1B and the external connecting means 1C and 1D). Thus, a crosspoint switch circuit array 1-1 composed of an 8×8 switch cell array can be configured without causing a multilevel wire crossing between the unit switch circuits 1-1.

If the unit switch circuit 1-1 is not connected with any other circuit at one side, that is, as shown in FIG. 2, in the unit switch circuits 1-1 arrayed to form a matrix of two rows and two columns, folding connecting circuits 7 and 8 are respectively provided on the sides of the unit switch circuit array corresponding to the external connecting means 1A of each unit switch circuit 1-1 positioned at the first row of the first column (upper left) and first row of the second column (upper right), and on the side of the second row of the first column (lower left) and the second row of the second column (lower right).

In this way, if the subject crosspoint switch circuit is not connected at the external connecting means 1A with the unit switch circuit (the first crosspoint switch circuit) 1-1, then the output terminal circuit 7A and the input terminal circuit 9B on the side of the input terminal side A of the switch cell element 1 (SW13) positioned at the first row of the first column are connected to each other, and the output terminal circuit 3A on the side of the output terminal C of the switch cell 1 (SW23, SW21) positioned at the first row of the jth column and the output terminal circuit 3B on the side of the input terminal A of the switch cell 1 (SW23, SW21, SW41) positioned at the first row of the j+1th column are connected to each other.

On the other hand, if the subject crosspoint switch circuit is not connected at the external connecting means 1B with the unit switch circuit (the second crosspoint switch circuit) 1-1, then the output terminal circuit 8A and the input terminal circuit 10B on the side of the input terminal side B of the switch cell element 1 (SW42) positioned at the last row of the first column are connected to each other, and the output terminal circuit 4A on the side of the output terminal D of the switch cell 1 (SW42, SW32, SW34) positioned at the last row of the jth column and the input terminal circuit 4B on the side of the input terminal B of the switch cell 1 (SW32, SW34, SW14) positioned at the last row of the j+1th column are connected to each other.

That is, if the subject crosspoint switch circuit is not connected at the first row (or last low) with other unit switch circuit 1-1, the switch cell 1 arrayed on the first row is connected to the folding connection circuit 7(8) so as to form a connection arrangement similar to the unit crosspoint switch circuit 1B-1 of a 4×4 matrix array as shown in FIG. 20.

As a result, as for the unit switch circuits 1-1 positioned at the upper left and upper right of FIG. 2, the output terminal C of the switch cell 1 positioned on the first row and the neighboring input terminal A of the switch cell 1 are sequentially connected to each other, while, as for the unit switch circuits 1-1 positioned at the lower left and lower right, the output terminal D of the switch cell 1 positioned on the last row and the neighboring input terminal B of the switch cell 1 are sequentially connected to each other. Thus, a transmission path of a signal supplied to the switch cell 1 positioned at the first row and the last row is secured, with the result that connection between the input highway and the output highway is guaranteed (perfect non-closing type crosspoint switch circuit 1-2 is realized).

Figure 3:
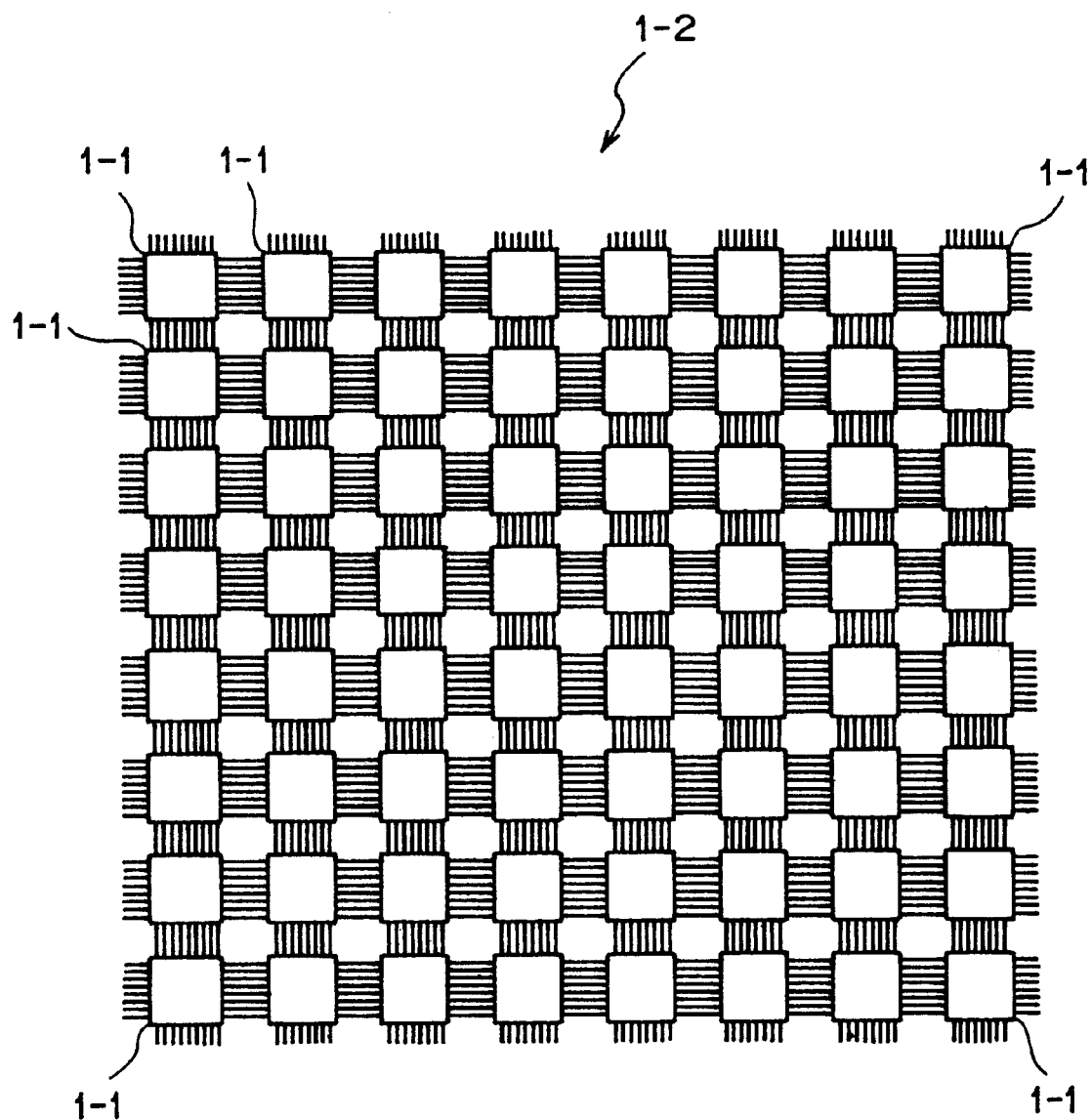
FIG. 3 is a block diagram showing a crosspoint switch circuit array in which a plurality of crosspoint switch circuits each shown in FIG. 1 are interconnected to one another in a planar fashion.

Similarly to what has been described above, if M×M unit switch circuits 1-1 shown in FIG. 1 are prepared and arrayed to form a matrix array of M×M as shown in FIG. 3 (in the case of FIG. 3, M=8, and reference numerals are partly omitted), and the unit switch circuits 1 adjacent to each other are connected to each other by means of the external connecting means 1A to 1D, then an M×M array of the crosspoint switch circuit 1-2 of a single stage link arrangement can be arranged. Thus, the number of input and output channel number can be increased upon necessity.

Therefore, it is possible to realize with ease a crosspoint switch circuit 1-2 having input and output channels of 512×512 or more, capable of dealing with 10 Gb/s, for example, which is requested for realizing a large capacity optical network.

In this case, when the unit switch circuits 1-1 are connected to each other, they can be connected by a planar wiring without using a multilevel crossing. Therefore, the connection of the unit switch circuit 1-1 can be implemented with ease by a printed circuit board pattern, a flat cable or the like. Thus, the unit switch circuits can be connected and assembled with no complexity as of a conventional multistage link arrangement. Therefore, the unit switch circuits can be assembled automatically by using an automatic wire bonder or the like, and hence productivity is improved and the number of steps of manufacturing can be remarkably decreased to reduce the cost thereof.

Further, according to the above embodiment, as will be described later on, each of the switch cells 1 is formed of an electronic circuit. Therefore, the crosspoint switch circuit 1-1 (1-2) can be integrated with ease. Moreover, a temperature controller is not necessary for each switch cell unlike in the case of an optical switch [it is sufficient to provide a switching control voltage generating circuit 2 for each crosspoint switch circuit 1-1 (or 1-2)]. Accordingly, electric power consumption thereof can be remarkably decreased.

Meanwhile, as the number of channels (channel size) are increased, a very large space is required for the circuits if the circuits are connected in the above-described planar manner. Therefore, as for example shown in FIG. 4, the M×M crosspoint switch circuit array 1-2 is integrated and formed into a single unit (unit switch circuit group) on a circuit board 11, and a plurality of the resulting board are prepared (in the case of FIG. 4, six sheets). These boards 11 (crosspoint switch circuits 1-2) are arrayed in a three-dimensional fashion (such as shown in FIG. 4, from the top, the right face of the board→back face of the same→the right face of the same→the back face of the same, . . . are directed upward in order), and then each of the crosspoint switch circuits 1-2 is connected to each other through a flat cable 11A or the like.

Figure 4:
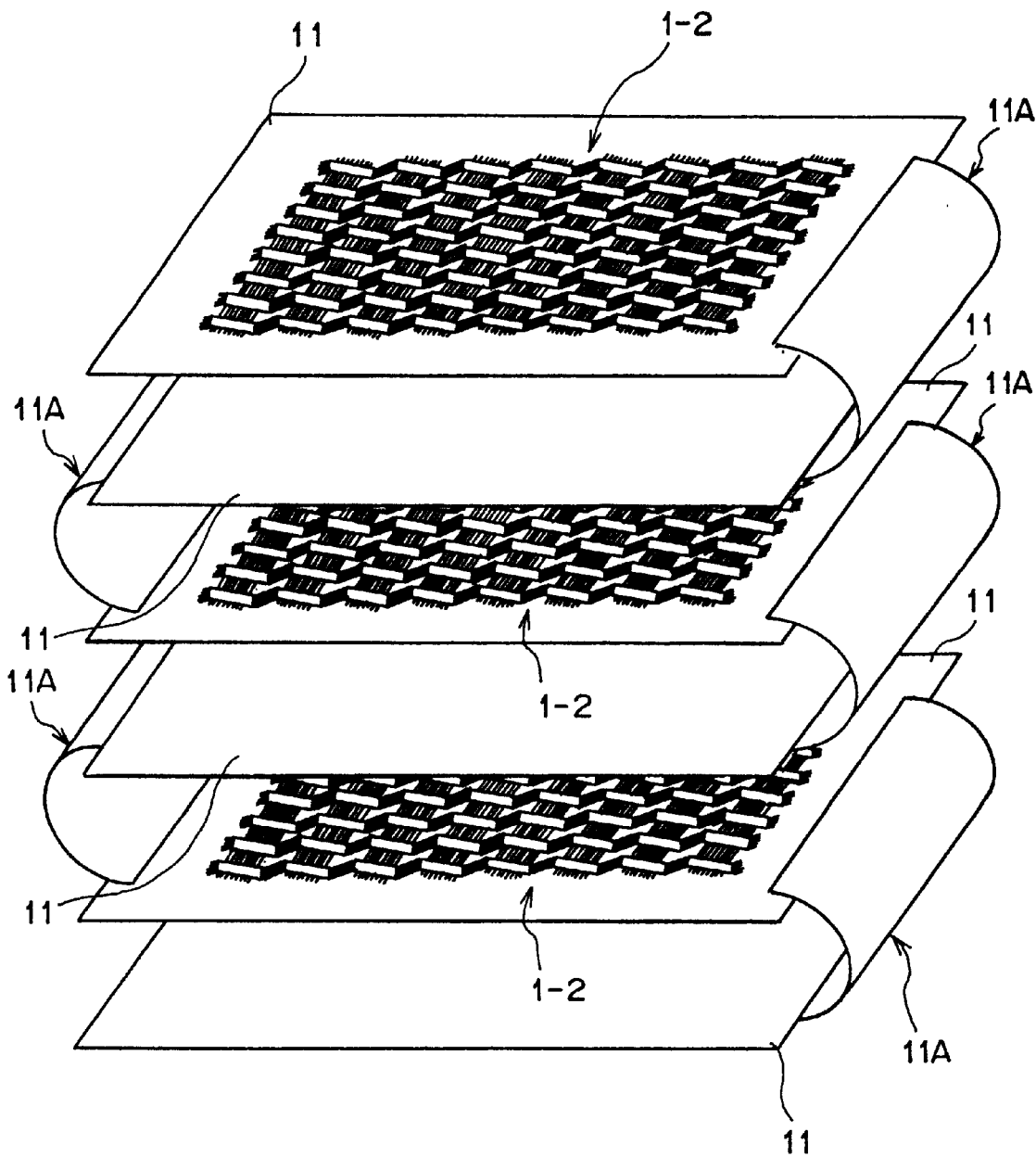
FIG. 4 is a perspective view schematically showing an arrangement in which a plurality of the crosspoint switch circuit arrays each shown in FIG. 3 are disposed three-dimensionally and interconnected to one another.

That is, the circuits shown in FIG. 4 are arranged in a conception that a sheet of crosspoint switch circuit is folded at the portion of the flat cable 11A. The configuration of FIG. 4 has at its lateral and longitudinal sides numbers of switch cells different from each other (and hence the matrix array of the switch cells does not form a square matrix). Therefore, a signal of each channel can undergo different number of switch cells.

Thus, each of the crosspoint switch circuits 1-2 is arranged to have a proper number of switch cell so that the assembled crosspoint switch circuit 1-2 (board 11) becomes a square matrix. In other words, as for example shown in FIG. 5, the crosspoint switch circuits are arranged three-dimensional fashion and the crosspoint switch circuits 1-2 adjacent to each other are interconnected by the coaxial arranged flat cables 11A, 11B or the like. In this event, the crosspoint switch circuits 1-2 adjacent to each other are connected so that the resulting circuit configuration forms a single sheet of crosspoint switch circuit 1-3 having the same number of switch cells on the lateral and longitudinal sides, respectively, (arrayed to form a matrix fashion) when each of the circuit 1-2 is developed.

Figure 5:
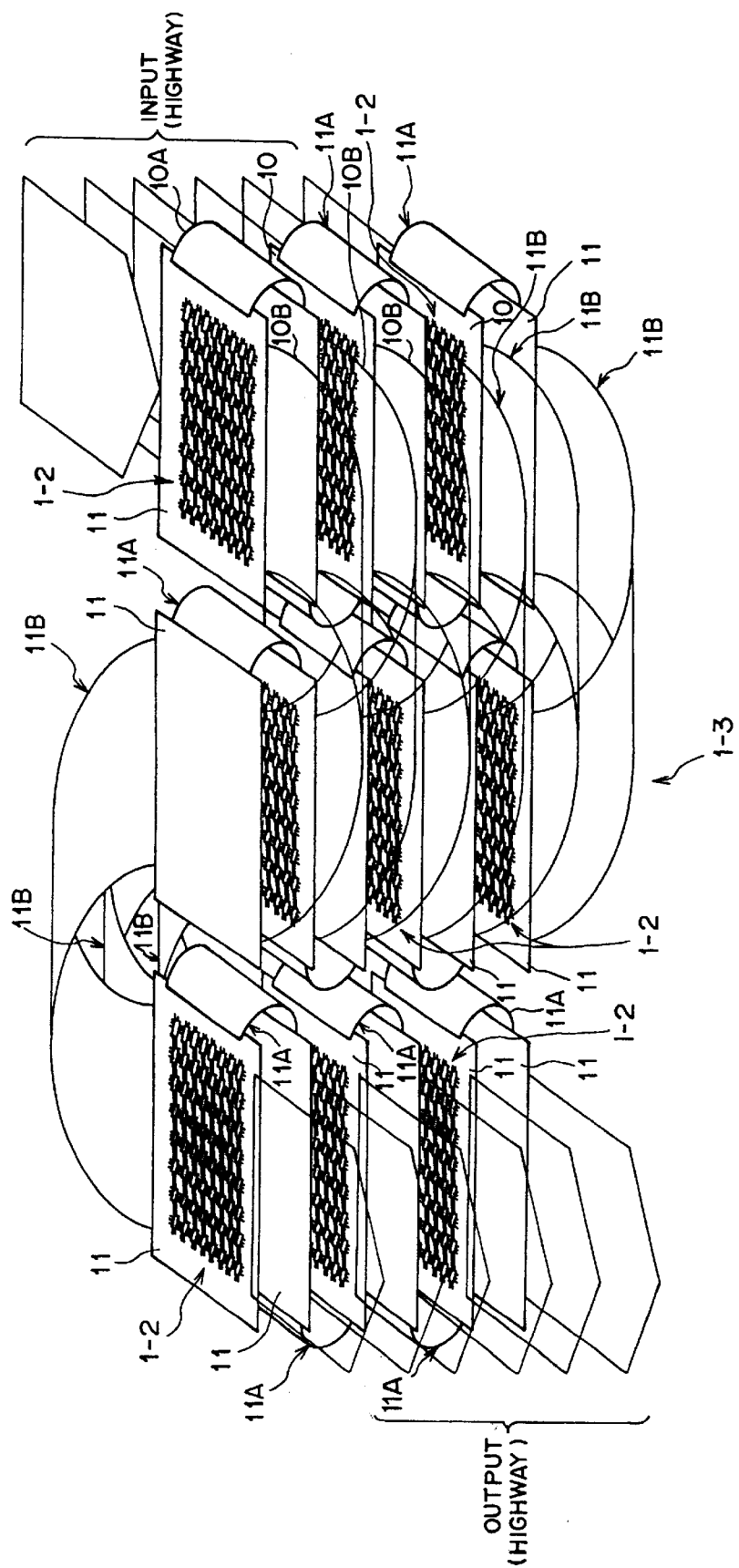
FIG. 5 is a perspective view schematically showing an arrangement in which a plurality of the crosspoint switch circuit arrays each shown in FIG. 3 are disposed three-dimensionally and interconnected to one another.

That is, the crosspoint switch circuit 1-3 shown in FIG.5 is composed of a plurality of the crosspoint switch circuits 1-2 shown in FIG.3. The crosspoint switch circuits 1-2 are arranged in a three-dimensional fashion and the crosspoint switch circuits 1-2 adjacent to each other interconnected through the external connecting means 1A to 1D so as to form a matrix array.

If the number of input and output channels are increased and thus the switch size becomes too large under the condition that the circuits are connected only in a planar fashion, the following solution can be selected. That is, there are prepared a plurality of the crosspoint switch circuit (unit switch circuit group) 1-2 having a small channel size and composed of a plurality of unit switch circuits 1 connected to one another in a planar fashion, and then they are arranged and connected in a three-dimensional fashion as shown in FIG. 5. In this way, the crosspoint switch circuit 1-3 having a large channel size can be arranged in an extremely compact fashion.

Further, since each of the crosspoint switches 1-2 can be connected to each other by using the flat cables 11A, 11B, complicated wiring work is not necessary and the resulting assembly can be very easily mounted on an apparatus frame. Further, since the circuits arranged in a three-dimensional fashion can be manufactured and assembled with ease, mass-production also becomes possible. As a result, it becomes possible to provide a crosspoint switch circuit 1-3 having a great number of input and output channels with a very cheap price. Each of the crosspoint switch circuits 1-2 may be connected to one another by any means other than the flat cables 11A, 11B.

Figure 6:
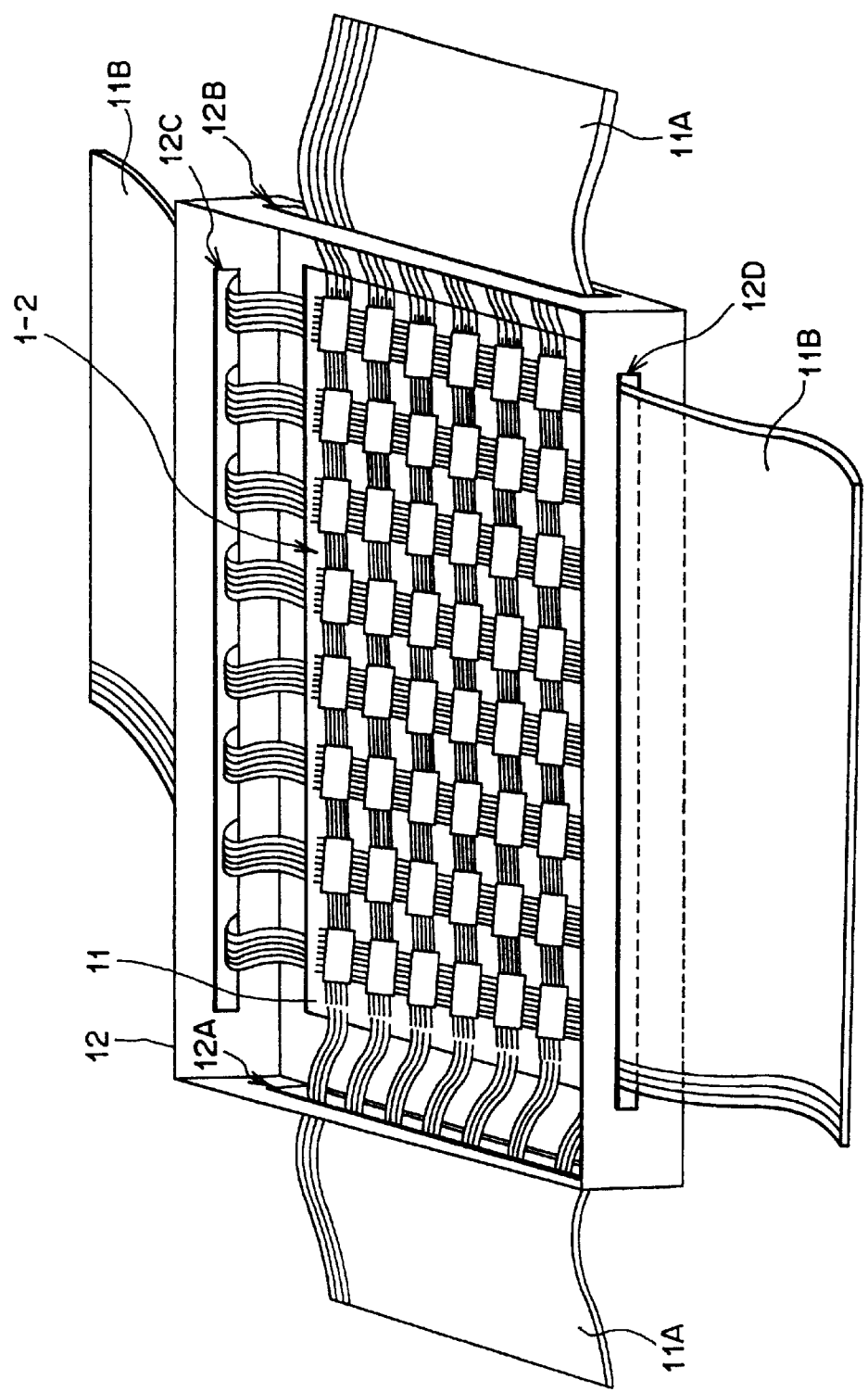
FIG. 6 is a perspective view schematically showing an appearance of an arrangement of a product version of the crosspoint switch circuit array shown in FIG. 3.

FIG. 6 is a perspective view schematically showing the appearance of the crosspoint switch circuit 1-2 fabricated in a product fashion. As shown in FIG. 6, the crosspoint switch circuit 1-2 (the board 11) is accommodated in a predetermined casing 12 or the like and the flat cables 11A and 11B are passed through apertures 12A to 12D of the casing 12 so that the circuit can be handled with ease when the component is ported or mounted on an apparatus frame or the like.

As described above, according to the present embodiment, a crosspoint switch circuit having a large channel size and a body size and with a small electric power consumption can be manufactured with ease at a low cost.

While in the above embodiment, as has been described above, the unit switch circuit 1-1 is arranged as a 4×4 matrix array (square matrix) of the switch cells of two input and two output type disposed and connected to one another, the arrangement of the matrix is not limited to the square matrix form but the unit switch circuit may be formed of the switch cells interconnected and arrayed in any matrix form having m×n (m, n is an integer greater than one).

In this case, if the M×N unit switch circuits 1-1 each having m×n switch cells are prepared and arrayed in an M×N matrix form, then there is formed a crosspoint switch array having mM×nN switch cells. Thus, if a smaller number is selected from mM and nN and utilized as a square crosspoint switch array of mM×mM or nN×nN, then it is possible to realize a perfect non-blocking type crosspoint switch circuit 1-2 (or 1-3) having a single stage arrangement.

That is, in the switch cell circuit 1-1, the number of switch cells arrayed in the longitudinal direction of the switch cell matrix need not be coincident with the number of switch cells arrayed in the lateral direction. In other words, if the switch cell circuit 1-1 has a matrix array sufficient to realize the perfect non-closing switch connection between the input highway and the output highway, then the object of the crosspoint switch circuit is attained.

Meanwhile, the unit switch circuit 1-1 (switch cell 1) shown in FIG. 1 may not be formed of an electronic circuit but formed of an optical circuit using an optical waveguide or the like, similarly to the conventional PI-LOSS type optical switch. In this case, the input terminal circuits 3B, 4B, 9B, 10B and the output terminal circuits 3A, 4A, 7A, 8A disposed on the sides 1a and 1b as shown in FIG. 1 may be also disposed on the sides 1c and 1d as shown in FIG. 7.

That is, the input terminal circuits 3B to 10B are disposed on the side 1c while the output terminal circuits 3A to 10A are disposed on the side 1d, so that the external connecting means 1E and 1F are formed. In FIG. 7, reference numeral 1' depicts a switch cell (a crosspoint of the optical waveguide) composed of an optical circuit such as an optical waveguide or the like.

Figure 7:
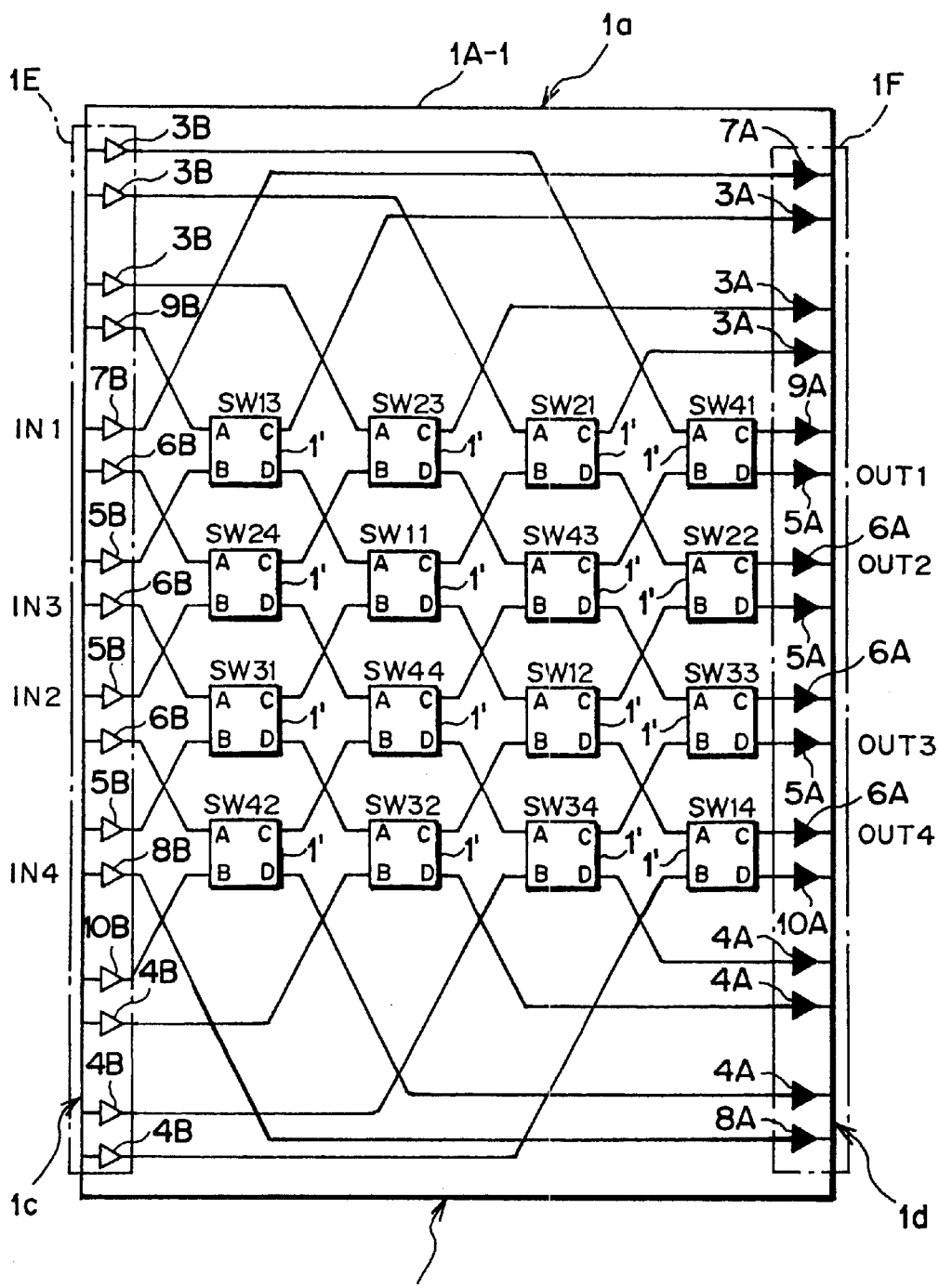
FIG. 7 is a block diagram showing a modification of the crosspoint switch circuit array shown in FIG. 1.

According to the structure of the unit switch circuit 1A-1 shown in FIG. 7, the bending angle of the optical waveguide (wiring in FIG. 7) becomes smaller as compared with the above-described unit switch circuit 1-1. Therefore, it is possible to suppress the influence caused from the optical loss or the like to a minimum level. Also in this case, if a plurality of unit switch circuits 1A-1 are arrayed in a matrix fashion as shown in FIG. 8 and the unit switch circuits 1A-1 adjacent to each other are connected to each other through the external connecting means 1E, 1F by way of an optical fiber or the like, then it is possible to realize a crosspoint switch circuit 1A-2 having an arbitrary channel size.

Figure 8:
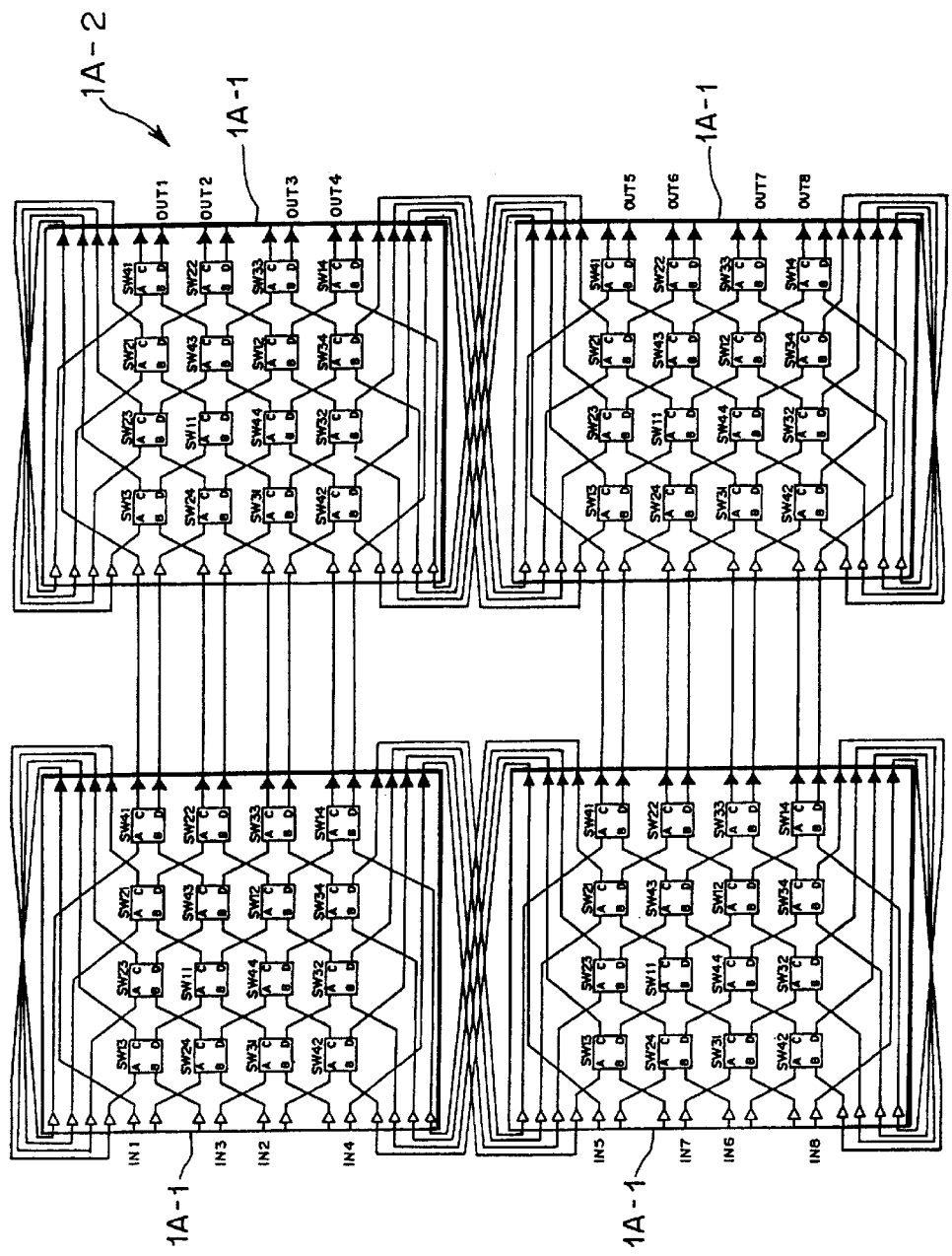
FIG. 8 is a block diagram showing an arrangement in which four crosspoint switch circuits each shown in FIG. 7 are interconnected to one another in a planar fashion.

In this case, however, a wiring of a multilevel crossing is caused as shown in FIG. 8 and hence the wiring thereof becomes complicated as compared with the case in which the unit switch circuits 1-1 formed of an electronic circuit are connected to one another. Further, if an optical fiber is employed for connection of the circuits, the connection with the optical waveguide requires a high accuracy. Therefore, it cannot be said that such an arrangement is a practical one as compared with the arrangement in which the flat cables 11A, 11B are employed. In FIG. 8, reference numerals shown in FIG. 7 is partially omitted.

(B) Detailed Description of the Switch Cell 1:

FIG. 9A is a block diagram useful for describing, on the basis of the operation principle, the arrangement of the switch cell (switch cell electronic circuit) 1 described above. As shown in FIG. 9A, the switch cell 1 according to the present embodiment is formed of electronic circuits each having electronic switches 15A, 15B, 16A and 16B independently controlled in their ON/OFF status by a switching control voltage generating circuit 2.

When the electronic switch 15A is supplied with a voltage signal A1 from the switching control voltage generating circuit 2 (hereinafter referred simply to "a voltage generating circuit 2") and brought to the ON state, then the electronic switch 15A is controlled to connect the input terminal B to the output terminal C. Similarly, when the electronic switch 15B is supplied with a voltage signal B1 from the voltage generating circuit 2 and brought to the ON state, then the electronic switch 15B connects the input terminal B to the output terminal C.

Similarly, when the electronic switch 16A is supplied with a voltage signal A2 from the voltage generating circuit 2 and brought to the ON state, then it connects the input terminal A to the output terminal D. When the electronic switch 16B is supplied with a voltage signal B2 from the voltage generating circuit 2 and brought to the ON state, then it connects the input terminal B to the output terminal D.

According to the above arrangement, if the switch cell 1 of the present embodiment is supplied with the voltage signals B1 and A2 each having an high(H) level (the voltage signals A1 and B2 are set to a Low(L) level), and thus only the electronic switches 15B and 16A are brought to the ON state, then the input signal supplied at the input terminal A is supplied to the output terminal D and generated therefrom while the input signal supplied at the input terminal B is supplied to the output terminal C and generated therefrom, whereby the cross-connection status (arrangement) is taken place as shown in FIG. 9B.

Conversely, if the switch cell is supplied with the voltage signals A1 and B2 each having an H level (the voltage signals B1 and A2 are set to the L level), and thus only the electronic switches 15A and 16B are brought to the ON state, then the input signal supplied at the input terminal A is supplied to the output terminal D without crossing and generated therefrom while the input signal supplied at the input terminal B is also supplied to the output terminal D without crossing and generated therefrom, whereby the bar-connection status (arrangement) is taken place as shown in FIG. 9C.

Figure 9D:
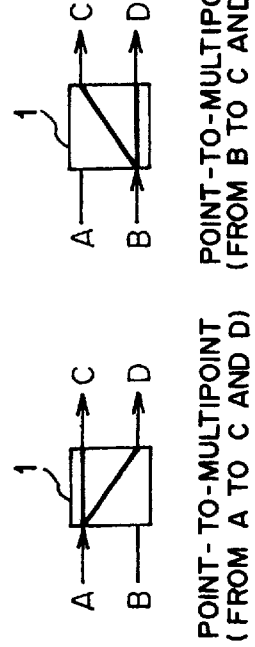

Also, for example, if the voltage signal A1 and A2 are set to the H level (the voltage signal B1 and B2 are set to the L level) so that only the electronic switches 15A and 15B are brought to the ON state, then the input signal supplied at the input terminal A is supplied to the output terminals C and D and generated therefrom, whereby the point-to-multipoint connection status (arrangement) is taken place at the terminal A as shown in FIG. 9D.

Figure 9E:
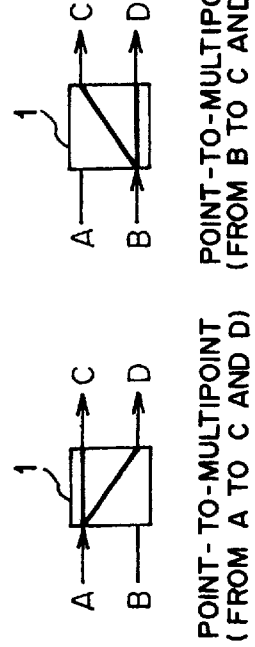

On the other hand, if the voltage signal B1 and B2 are set to the H level (the voltage signal A1 and A2 are set to the L level) so that only the electronic switches 16A and 16B are brought to the ON state, then the input signal supplied at the input terminal B is supplied to the output terminals C and D and generated therefrom, whereby the point-to-multipoint connection status (arrangement) is taken place at the terminal B as shown in FIG. 9E.

That is, the above electronic switches 15A and 16A function as a first electronic switch unit which makes the input terminal A electrically connectable to either or both of the output terminals C and/or D while the electronic switches 15B and 16B function as a second electronic switch unit which makes the input terminal B electrically connectable to either or both of the output terminals C and/or D.

Thus, it becomes possible to realize a fundamental function (i.e., cross connection and bar connection) necessary as a switch cell (crosspoint of the optical waveguide) of the conventional PI-LOSS type switch, by electronic circuits, and also it becomes possible to realize the point-to-multipoint connection function which has not been implemented by the optical switch. Accordingly, great contribution can be expected in realizing a crosspoint switch circuit 1-1 (1-2, 1-3) having a multifunction and flexibility.

Figure 10:
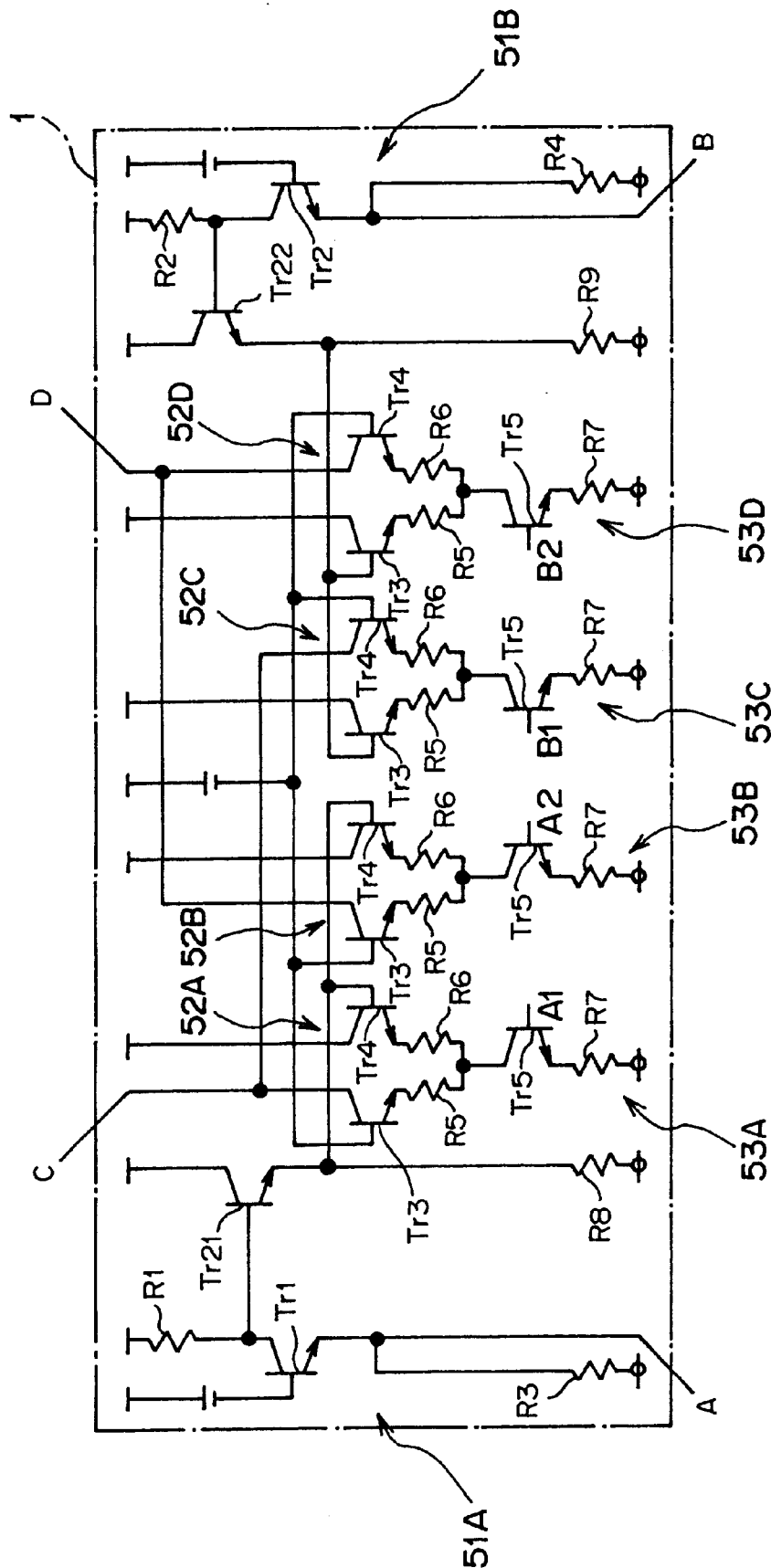
FIG. 10 is an electronic circuit diagram showing one mode of the switch cell according to the present invention.

(B1) Description on the First Mode of the Switch Cell 1:

In more concretely, the above-described switch cell 1 is arranged to have transistors Tr1 to Tr5, Tr21, Tr22 (either of the bipolar type and FET type is allowable) and resistors R1 to R9, as for example shown in FIG. 10.

The transistor (a first transistor) Tr1 is a transistor of a base-ground arrangement in which the collector thereof is connected with the resistor (a first load resistor) R1 and the emitter thereof is connected with the resistor R3 in a parallel fashion, whereby a (first) input circuit 51A is formed. also, the emitter of the transistor Tr1 is connected to the one of the input terminals, A.

Similarly, the transistor (a second transistor) Tr2 is a transistor of a base-ground arrangement in which the collector thereof is connected with the resistor (a second load resistor) R2 and the emitter thereof is connected with the resistor R4 in a parallel fashion, whereby a (second) input circuit 51B is formed. Also, the emitter of the transistor Tr2 is connected to the other of the input terminals, B.

Further, each set of the transistors Tr3 and Tr4 (third and fourth transistors) of the four sets are arranged as a differential arrangement in which the emitters thereof are connected to each other through the resistors R5 and R6 as shown in FIG. 10. Thus, the four sets of output current switch circuits (first to fourth output current switch circuits) 52A to 52D are formed. Of the four output current switch circuits, the two output current switch circuits 52A and 52B function as the above electronic switches 15A and 16A (first electronic switch), respectively, while the remaining two output current switch circuits 52C and 52D function as the above electronic switches 15B and 16B (second electronic switch), respectively.

Then, the transistor Tr3 of the output current switch circuit 52A and the transistor Tr4 of the output current switch circuit 52C are connected in parallel at each of the collectors, thus forming the output terminal C. The transistor Tr3 of the output current switch circuit 52B and the transistor Tr4 of the output current switch circuit 52D are connected in parallel at each of the collectors, thus forming the output terminal D.

Further, as shown in FIG. 10, the transistor Tr4 of the output current switch circuit 52A and the transistor Tr4 of the output current switch circuit 52B are connected in parallel at each of the bases through the transistor Tr21 which is arranged as an emitter-follower arrangement with the resistor R1 of the input circuit 51A. The transistor Tr3 of the output current switch circuit 52C and the transistor Tr3 of the output current switch circuit 52D are connected in parallel at each of the bases through the transistor Tr22 which is arranged as an emitter-follower arrangement with the resistor R2 of the input circuit 51B.

The transistors Tr3 and Tr4 may not be connected to the resistor R1 (R2) through the transistor Tr21, Tr22 which is provided as the emitter-follower arrangement.

The resistors R5 and R6 of each output current switch circuits 52A to 52D are connected in parallel to each of the four transistors Tr5 (fifth transistor) at the collector thereof, and the emitter of each transistor Tr5 is connected with the resistor R7 (third load resistor). In this way, four sets of current source circuits (first to fourth current source circuits) 53A to 53D are formed. If base potentials A1, A2, B1, B2 of the transistors Tr5 are independently controlled by the aforesaid voltage signals A1, A2, B1, B2, respectively, so that each of the amount of the current flowing in the current source circuits 53A to 53D is controlled, then the currents flowing in the output current switch circuits 52A to 52D are controlled. Thus, as has been described with reference to FIGS. 9B to 9E, the connection status between the input terminals A and B and the output terminals C and D is changed.

For example, if the base potential A2, B1 of each transistor Tr5 of the current source circuit 53B, 53C is set to the H level, then the transistors Tr3 and Tr4 of the output current switch circuit 52B, 52C is brought into the ON state, with the result that the input terminal A and the output terminal D are connected to each other through the collector of the transistor Tr3 of the output current switch circuit 52B, while the input terminal B and the output terminal C are connected to each other through the collector of the transistor Tr4 of the output current switch circuit 52C. In this way, the above-described "cross-connection" is realized.

Similarly, if the base potential A1, B2 is set to the H level, then the transistors Tr3 and Tr4 of the output current switch circuit 52A, 52D is brought into the ON state, with the result that the input terminal A and the output terminal C are connected to each other through the collector of the transistor Tr3 of the output current switch circuit 52A, while the input terminal B and the output terminal D are connected to each other through the collector of the transistor Tr4 of the output current switch circuit 52D. In this way, the above-described "bar-connection" is realized.

Further, if the base potential A1, A2 is set to the H level, then the transistors Tr3 and Tr4 of the output current switch circuit 52A, 52B is brought into the ON state, with the result that the input terminal A and the output terminals C and D are connected to each other through the collector of the transistor Tr3 of the output current switch circuits 52A and 52B. In this way, the above-described "point-to-multipoint connection at the terminal A" is realized.

Furthermore, if the base potential B1, B2 is set to the H level, then the transistors Tr3 and Tr4 of the output current switch circuit 52C, 52D is brought into the ON state, with the result that the input terminal B and the output terminals C and D are connected to each other through the collector of the transistor Tr4 of the output current switch circuits 52C and 52D. In this way, the above-described "point-to-multipoint connection at the terminal B" is realized.

According to the above arrangement of the switch cell 1 formed of electronic circuits, the following advantages can be obtained.

(1) Since the output current switch circuits 52A to 52D can also function as an amplifier, even if the signal level is decreased between the switch cells 1, the drop of the signal level can be amplified and reproduced within the switch cells 1. Accordingly, if the crosspoint switch circuits 1-1 (1-2, 1-3) are arranged to have a large channel size as described above, the signal level or the waveform of the signal transmitted between the input highway and the output highway can positively be protected from being deteriorated. Moreover, crosstalk, noise or the like can be reduced.

(2) If a signal is distributed to a plural points, the signal can be reproduced at the original level owing to the signal amplifying function within the switch cell 1. Therefore, it is possible to implement a stable point-to-multipoint function with ease.

(3) Since the circuit components can be integrated as a semiconductor chip or the like, the resulting circuit arrangement can be remarkably small-sized as compared with when the switch cell is formed of the optical waveguide like the PI-LOSS type optical switch and so on.

(4) It is not necessary to provide an external circuit such as a temperature controller for each switch cell unlike the PI-LOSS type optical switch using the optical waveguide. Therefore, the switch can be remarkably small-sized and the electric consumption thereof can also be remarkably reduced.

(5) Since the switch cell can be electrically connected (with a current signal) to an external circuit (e.g., another switch cell 1, the output terminal circuits 3A to 10A, the input terminal circuits 3B to 10B), it is not necessary to arrange a complicated optical coupling with an optical fiber or the like.

Figure 11:
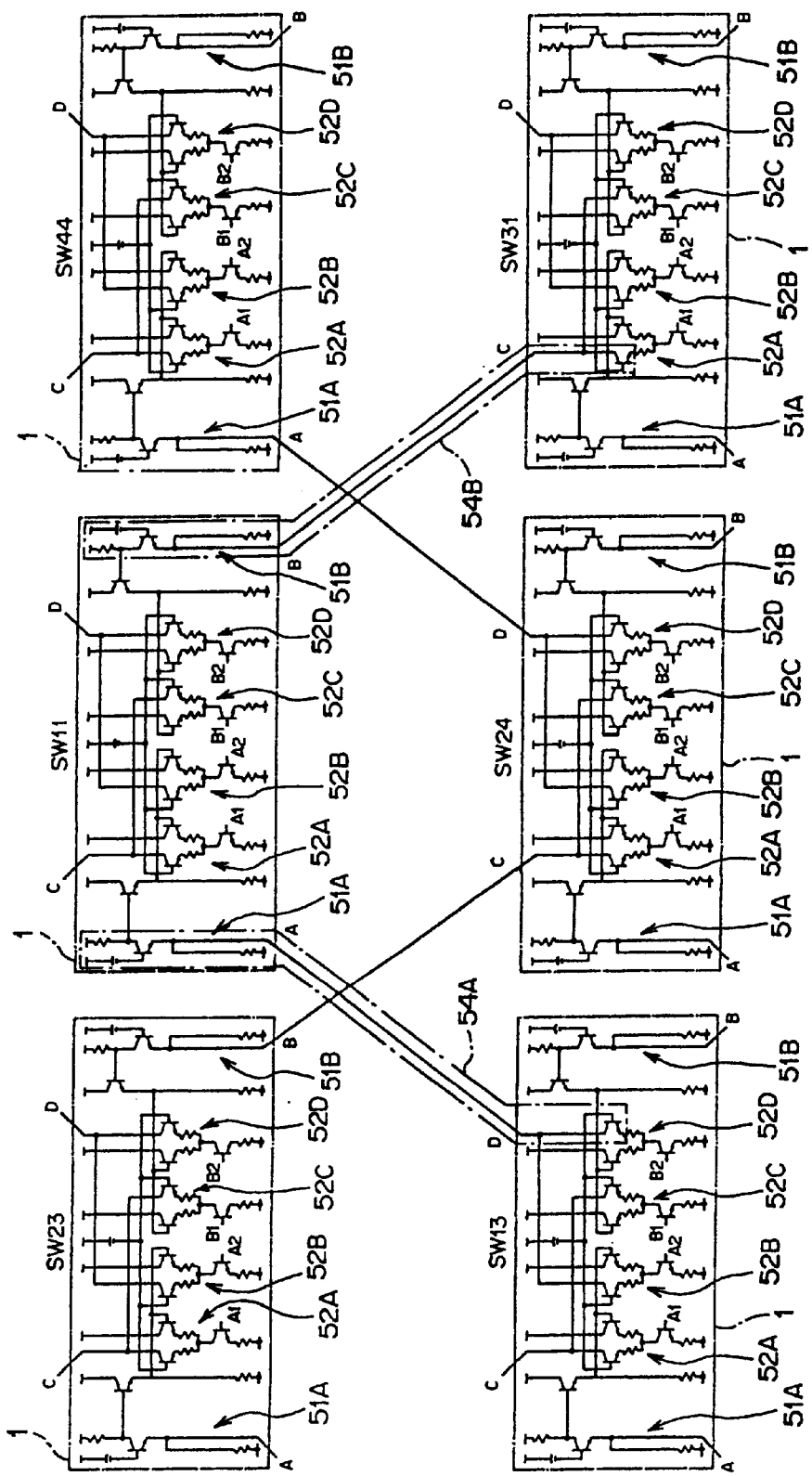
FIG. 11 is an electronic circuit diagram showing an arrangement in which a plurality of electronic circuits each shown in FIG. 10 are interconnected to one another in accordance with the connection arrangement shown in FIG. 1.

FIG. 11 is a diagram showing a connection arrangement in which a number of switch cells 1, arranged as described above, are connected to one another. The diagram of FIG. 11 mainly represents a connection arrangement of the switch cells SW13, SW24, SW31, which are positioned on the first column of the switch cell array shown in FIG. 1, and the switch cells SW23, SW11, SW44, which are positioned on the second column of the switch cell array shown in FIG. 1. However, a connection arrangement of the rest of the switch cells 1 is similar to that connection arrangement. Further, each of the switch cells 1 is similarly arranged to that shown in FIG. 10. Thus, in FIG. 11, reference numerals each shown in FIG. 10 are partially omitted.

Now, connection arrangement of the switch cell SW11 will be described in detail. As shown in FIG. 11, one input terminal A of the SW11 is connected to the output terminal D of the switch cell SW13 (first different switch cell) while the other input terminal B of the same is connected to the switch cell SW31 (second different switch cell).

According to the above connection arrangement, there is formed a (first) cascode interface circuit 54A in which the emitter of the transistor Tr1 of the input circuit 51A of the switch cell SW11 is connected in a cascode fashion to the collector of the transistor Tr4 of the output current switch circuit 52D of the switch cell SW13. Also, there is formed a (second) cascode interface circuit 54B in which the emitter of the transistor Tr2 of the other input circuit 51B of the switch cell SW11 is connected in a cascode fashion to the collector of the transistor Tr3 of the output current switch circuit 52A of the switch cell SW31.

The cascode interface circuit similar to that described above is also formed in connection between other switch cells 1.

In this way, the voltage will not change in the wiring between the switch cells and signal connection with a current signal is established. Therefore, the switch cells 1 can be prevented from being influenced from the strayed capacity caused between the wiring of the switch cells 1, with the result that it becomes possible to realize a high bit-rate characteristic that can cope with a signal transmission at an ultrahigh bit-rate such as about 10 Gb/s, for example. Further, the switch cells can be prevented from being influenced from the crosstalk between signals caused from the capacitive coupling between the multilevel crossing of the wiring.

If the arrangement equivalent to that of the PI-LOSS type optical switch (see FIG. 1) is formed of the above switch cells made of an electronic circuit, similarly to the case of the PI-LOSS type optical switch, the number of switches and the length of path that the signal undergoes will not change depending on the change of signal path caused from the switch connecting status. Therefore, it is hard to cause the characteristic difference at each channel, with the result that it becomes possible to obtain a very stable characteristic for a signal transmitted at an ultrahigh bit-rate such as about 10 Gb/s.

That is, if the arrangement equivalent to that of the PI-LOSS type optical switch is formed of the above switch cells made of an electronic circuit, then it becomes possible to retain the merit inherent in the PI-LOSS type optical switch while to overcome the demerit inherent in the optical switch as described above.

The above switch cell 1 may be arranged, as for example shown in FIG. 12, by modifying the arrangement shown in FIG. such that the transistors Tr1, Tr2, Tr21, Tr22 and the resistors R1 to R4, R8, R9 are arranged as a differential arrangement, the input circuits 51A, 51B and input terminals A and B are arranged as a differential arrangement, and the output terminals C, D are arranged as a differential arrangement as follows.

That is, each collector of the transistors Tr3, Tr4 of the output current switch circuit 52A is arranged as a differential arrangement and is provided as the output terminal C, each collector of the transistors Tr3, Tr4 of the output current switch circuit 52C is connected in parallel to the output terminal C, and each collector of the transistors Tr3, Tr4 of the output current switch circuit 52D is arranged as a differential arrangement and is provided as the output terminal D, each collector of the transistors Tr3, Tr4 of the output current switch circuit 52B is connected in parallel to the output terminal D.

Figure 12:
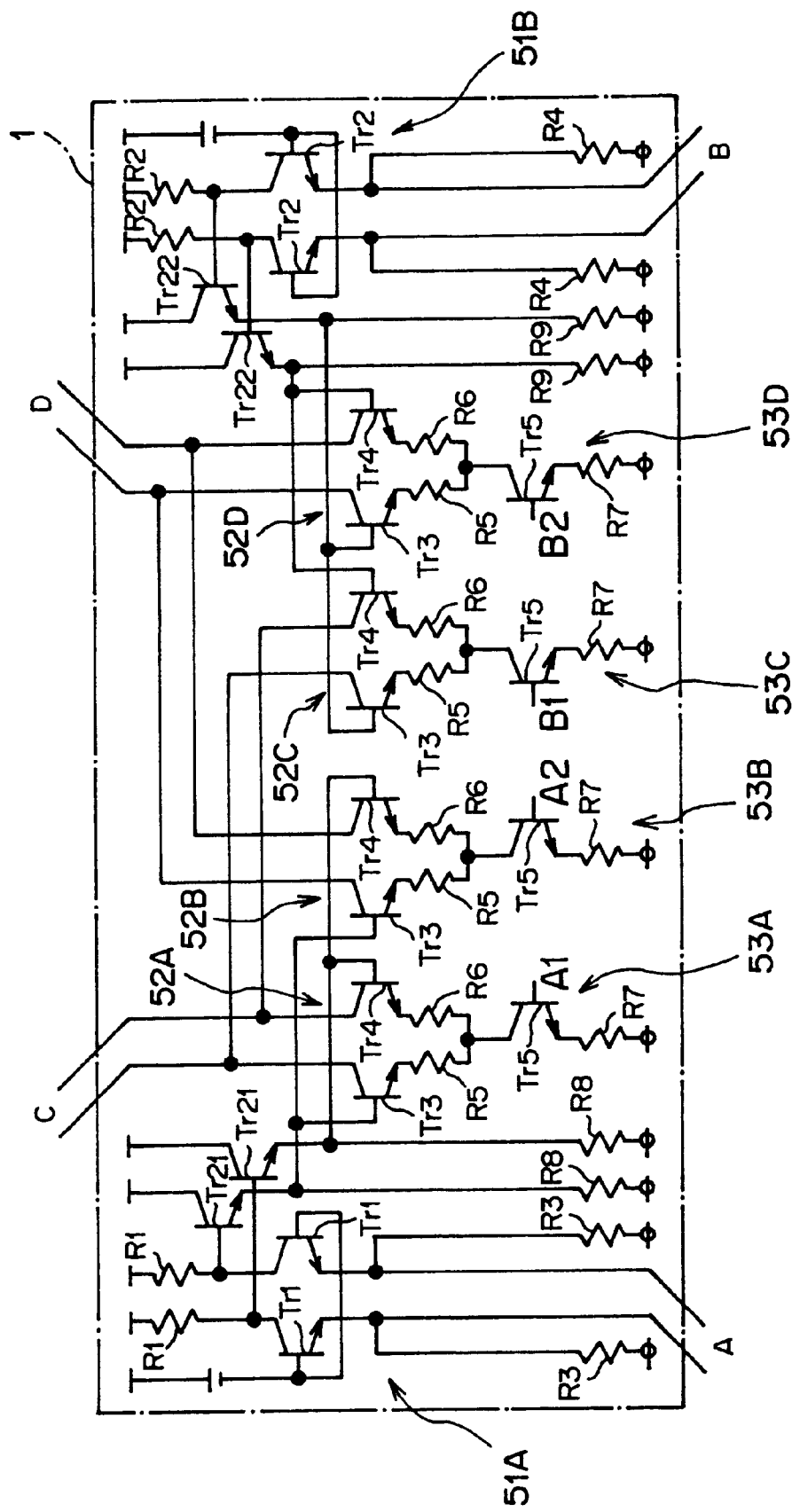
FIG. 12 is an electronic circuit diagram in which the switch cell element shown in FIG. 10 is modified to have a differential arrangement.
Figure 13:
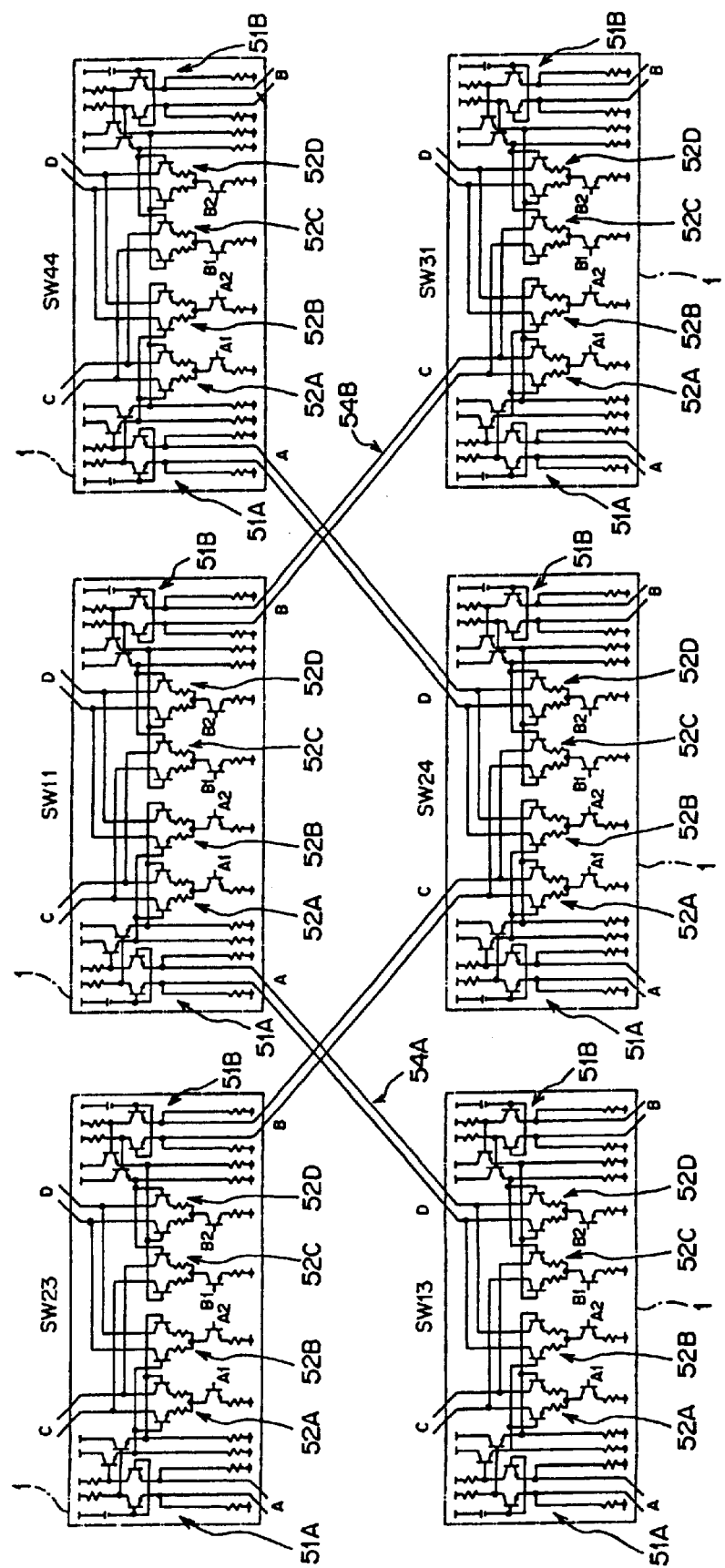
FIG. 13 is an electronic circuit diagram showing an arrangement in which a plurality of switch cells each shown in FIG. 12 are interconnected to one another.

FIG. 13 shows a connection arrangement corresponding to the arrangement shown in FIG. 11 when each switch cell 1 is arranged as described above. Each switch cell 1 is arranged as described with reference to FIG. 12. Thus, almost all reference numerals shown in FIG. 12 are omitted in FIG. 13.

According to the switch cells 1 including the differential arrangement shown in FIG. 12 (FIG. 13), an effect (including an effect deriving from the cascode interface circuits 54A, 54B) similar to that described with reference FIG. 10 (FIG. 11) is obtained. Moreover, the following advantages can be obtained.

(1) Influence deriving from switching noise can be suppressed.

(2) The switching circuits can be fabricated into semiconductor integrated circuits with ease.

(3) Stability against fluctuation in the temperature or the power supply voltage can be improved.

(4) When a high rate signal is supplied thereto to drive the circuit at a high speed, the power supply current amount within the circuit can be prevented from fluctuation. Thus, the circuit can be operated at a high speed with stability, and it is possible to suppress influence on other circuits.

(5) The multilevel wiring between the switch cells 1 becomes a multilevel wiring formed of a signal wiring of a differential arrangement. Thus, crosstalk between the signals transmitted at the wiring crosspoint can be more suppressed.

Figure 14:
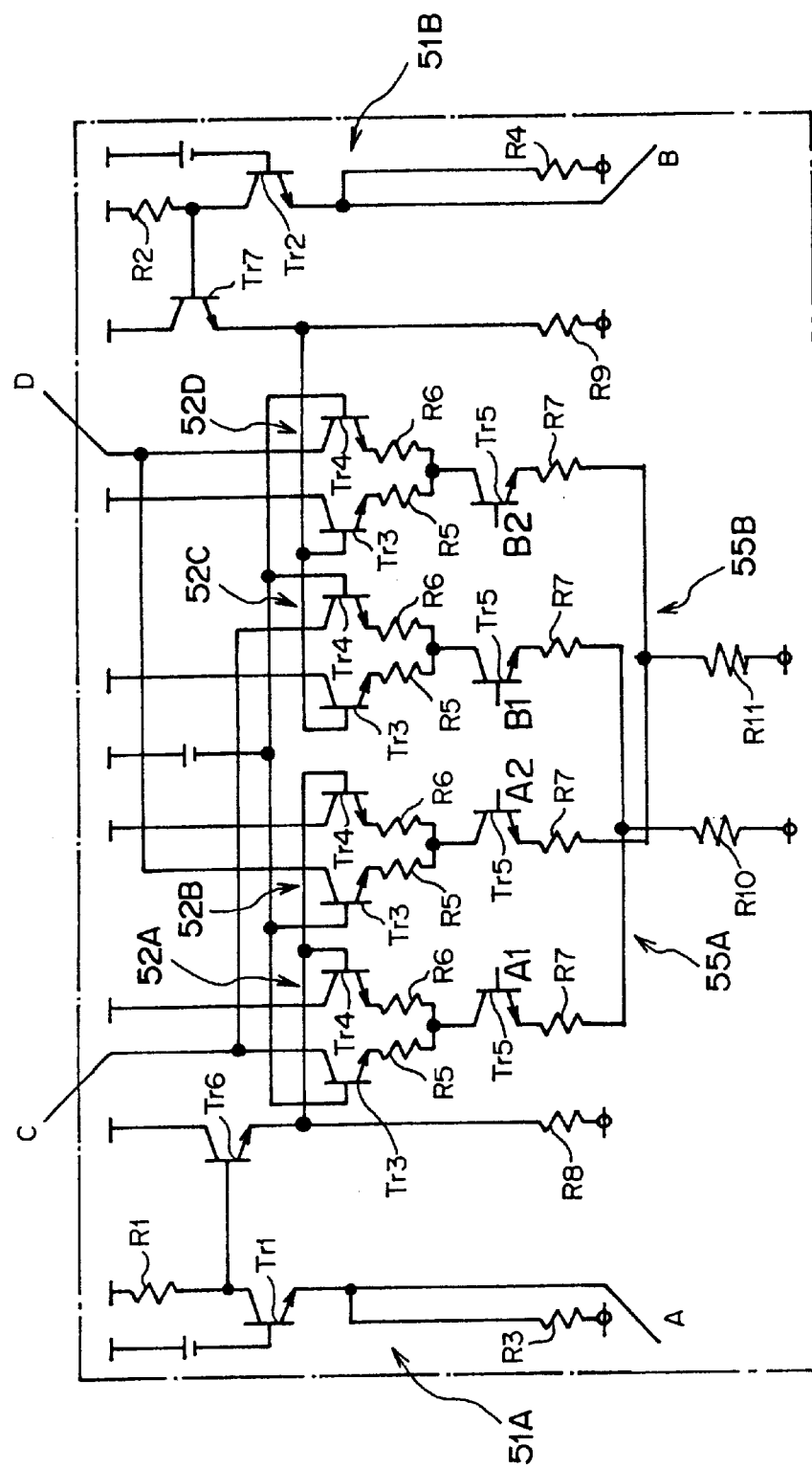
FIG. 14 is an electronic circuit diagram showing a modification of the switch cell shown in FIG. 10.
Figure 15:
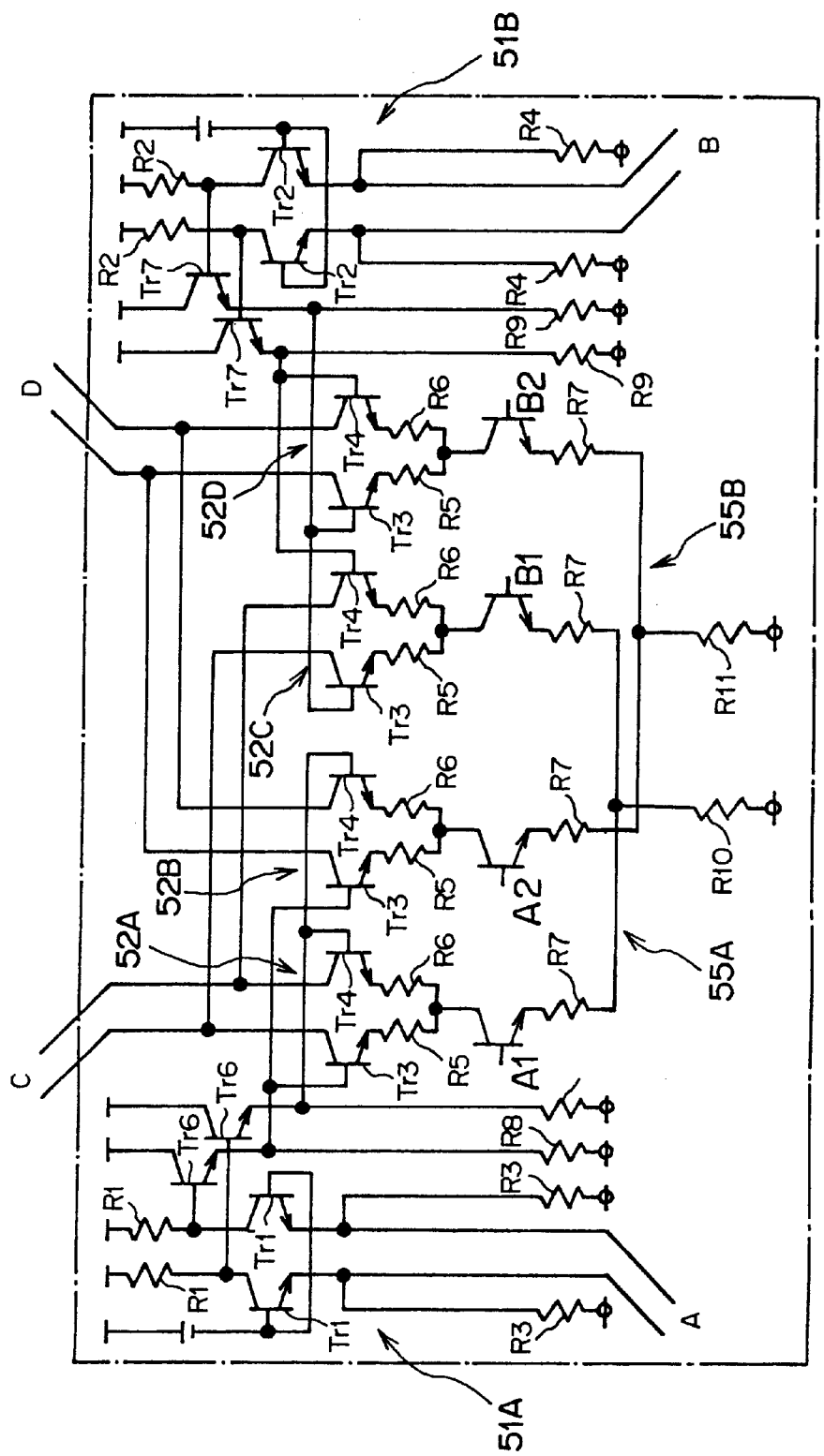
FIG. 15 is an electronic circuit diagram showing a modification of the switch cell shown in FIG. 12.

The switch cell 1 may not be arranged as shown in FIG. 10 or FIG. 12 but arranged as shown in FIGS. 14 or 15, for example. That is, the resistors R7 forming the current source circuits 53A, 53C, respectively, may be connected in parallel and a resistor R10 is connected to the connection point thereof while the resistors R7 forming the current source circuits 53B, 53D, respectively, may be connected in parallel and a resistor R11 is connected to the connection point thereof.

In this way, the current source circuits 53A and 53C are replaced with a current switch circuit 55A while the current source circuits 53B and 53D are replaced with a current switch circuit 55B. Therefore, if one of the transistors Tr5 each connected to the output current switch circuit 52A, 52C is turned on, the other of the transistors is turned off.

Similarly, if one of the transistors Tr5 each connected to the output current switch circuit 52B, 52D is turned on, the other of the transistors is turned off.

For example, if the base potentials A2 and B1 of the transistors Tr5 connected to the output current switch circuits 52B and 52C, respectively, are set to an H-level (cross-connection status is taken place), the transistors Tr5 connected to the remaining two output current switch circuits 52A and 52D, respectively, are turned off, with the result that current flows only in the output current switch circuits 52B and 52C.

Similarly, if the base potentials A1 and B2 of the transistors Tr5 connected to the output current switch circuits 52A and 52D, respectively, are set to the H-level (bar-connection status is taken place), the transistors Tr5 connected to the remaining two output current switch circuits 52B and 52C, respectively, are turned off, with the result that current flows only in the output current switch circuits 52A and 52D.

Further, if the base potentials A1 and A2 of the transistors Tr5 connected to the output current switch circuits 52A and 52B, respectively, are set to the H-level (point-to-multipoint connection status at the terminal A is taken place), the transistors Tr5 connected to the remaining two output current switch circuits 52C and 52D, respectively, are turned off, with the result that current flows only in the output current switch circuits 52A and 52B.

Furthermore, if the base potentials B1 and B2 of the transistors Tr5 connected to the output current switch circuits 52C and 52D, respectively, are set to the H-level (point-to-multipoint connection status at the terminal B is taken place), the transistors Tr5 connected to the remaining two output current switch circuits 52A and 52B, respectively, are turned off, with the result that current flows only in the output current switch circuits 52C and 52D.

That is, the current switch circuit 55A functions as a first current switch control circuit for allowing current to flow in only either one of the output current switch circuit 52A or 52C while the current switch circuit 55B functions as a second current switch control circuit for allowing current to flow in only either one of the output current switch circuit 52B or 52D.

Accordingly, it becomes possible to prevent erroneous operation (such as when the transistor Tr5 of the base potential A1 (base potential A2) and the transistor Tr5 of the base potential B1 (base potential B2) are simultaneously turned on) from being taken place upon effecting the above connecting status of the "cross-connection", "bar-connection", "point-to-multipoint connection at the terminal A" and "point-to-multipoint connection at the terminal B" (i.e., the connecting status is changed). Therefore, the switch cell 1 becomes more reliable in its switching operation.

Figure 16:
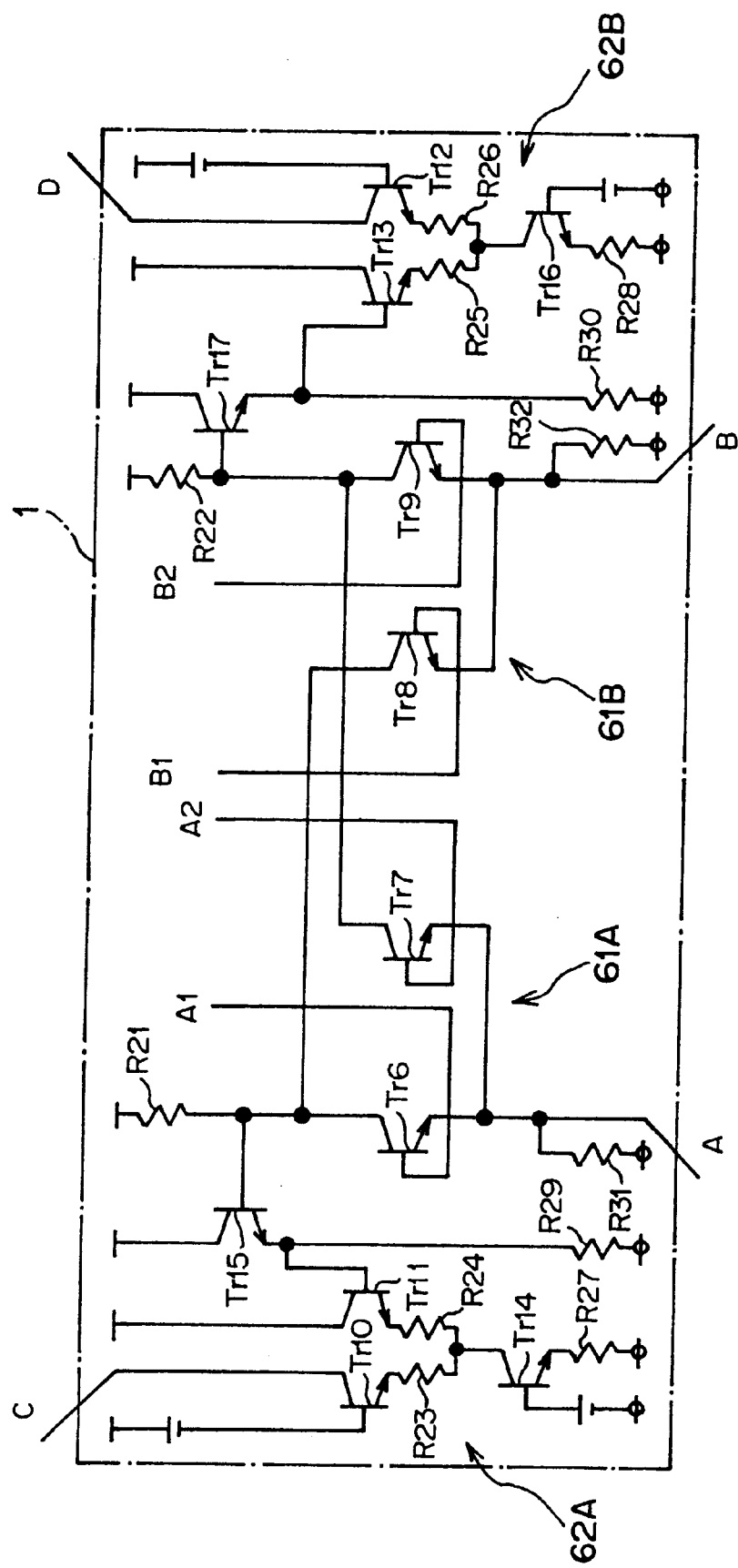
FIG. 16 is an electronic circuit diagram showing an arrangement of a switch cell as second embodiment of the present invention.

(B2) Description on the Second Mode of the Switch Cell:

The above switch cell 1 can be implemented by an arrangement as shown in FIG. 16, for example. In the arrangement shown in FIG. 16, each of the transistors Tr6 to Tr17 may be either of a bipolar type or an FET type.

That is, the emitters of two transistors Tr6, Tr7 (sixth and seventh transistors) are connected in parallel to provide the input terminal A while the emitters of two transistors Tr8, Tr9 (eighth and ninth transistors) are connected in parallel to provide the input terminal B. Further, the collectors of the transistors Tr6 and Tr8 are connected in parallel to a resistor (fourth load resistor) R21 corresponding to the output terminal C while the collectors of the transistors Tr7 and Tr9 are connected in parallel to a resistor (fifth load resistor) R22 corresponding to the output terminal D.

In this way, there is formed a (third) input current switch circuit 61A serving as the first electronic switch unit (electronic switches 15A and 15B) in which there are provided the transistors Tr6 and Tr7 and the emitters of the transistors Tr6 and Tr7 are connected in parallel to provide the input terminal A. Also there is formed a (fourth) input current switch circuit 61B serving as the second electronic switch unit (electronic switches 16A and 16B) in which there are provided the transistors Tr8 and Tr9 and the emitters of the transistors Tr8 and Tr9 are connected in parallel to provide the input terminal B.

Further, the base of the transistor Tr15 is connected in parallel to the resistor R21, the emitter of the transistor Tr15 is connected to a resistor R29. Then, the resistor R29 is connected in parallel fashion with the base of one transistor Tr11 of a couple of transistors Tr10 and Tr11 arranged as a differential arrangement. Then, the collector of the other transistor Tr10 is made as the output terminal C. The transistors Tr10 and Tr11 are connected at each the emitter with resistors R23 and R24, respectively. The resistors R23 and R24 are connected in parallel to the collector of a transistor Tr14. The transistor Tr14 is connected at the emitter with a resistor R27.

Thus, there is formed a (fifth) output current switch circuit 62A in which there are provided the transistors Tr10 and Tr11 (tenth and eleventh transistors) connected to each other through each the emitter to be arranged as the differential arrangement, the collector of the transistor Tr11 is made as the output terminal C, and the base of the transistor Tr11 is connected (through the transistor Tr15 of an emitter-follower arrangement) to the resistor R21 in parallel. A part of the circuit composed of the transistor Tr14 and the resistor R27 functions as a current source circuit.

Similarly, the base of the transistor Tr17 is connected to the resistor R22, the emitter of the transistor Tr17 is connected to a resistor R30. Then, the resistor R30 is connected in parallel fashion with the base of one transistor Tr13 of a couple of transistors Tr12 and Tr13 arranged as a differential arrangement. Then, the collector of the other transistor Tr12 is made as the output terminal D. The transistors Tr12 and Tr13 are connected at each the emitter with resistors R25 and R26, respectively. The resistors R25 and R26 are connected in parallel to the collector of a transistor Tr16. The transistor Tr16 is connected at the emitter with a resistor R28.

Thus, there is formed a (sixth) output current switch circuit 62B in which there are provided the transistors Tr12 and Tr13 (twelfth and thirteenth transistors) connected to each other through each emitter to be arranged as the differential arrangement, the collector of the transistor Tr12 is made as the output terminal D, and the base of the transistor Tr13 is connected (through the transistor Tr17 of an emitter-follower arrangement) to the resistor R22. A part of the circuit composed of the transistor Tr16 and the resistor R28 functions as a current source circuit.

Then, the base potentials A1, A2, B1, B2 of the transistors Tr6 to Tr9 can be independently controlled so that the connecting status between the input terminals A and B and the output terminals C and D.

For example, if the base potentials A2 and B1 of the transistors Tr7 and Tr8 are set to the H-level (and the remaining base potentials A1 and B2 of the transistors Tr6 and Tr9 are set to the L-level), then only the transistors Tr7 and Tr8 are turned on, with the result that a voltage signal is generated on each of the resistors R21 and R22. The voltage signal generated on the resistor R21 turns the transistors Tr15, Tr11, Tr12, Tr14 on while the voltage signal generated on the resistor R22 turns the transistors Tr17, Tr12, Tr13, Tr16 on.

Thus, the input terminal A is brought into a state in which it is connected through the collector of the transistor Tr7 to the output terminal D while the input terminal B is brought into a state in which it is connected through the collector of the transistor Tr8 to the output terminal C. In this way, the "cross-connection" is realized.

Conversely, if the base potentials A1 and B2 of the transistors Tr6 and Tr9 are set to the H-level (and the remaining base potentials A2 and B1 of the transistors Tr7 and Tr8 are set to L level), then the input terminal A is brought into a state in which it is connected through the collector of the transistor Tr6 to the output terminal C while the input terminal B is brought into a state in which it is connected through the collector of the transistor Tr9 to the output terminal D. In this way, the "bar-connection" is realized.

Further, if the base potentials A1 and A2 of the transistors Tr6 and Tr7 are set to the H-level, then the input terminal A is brought into a state in which it is connected through the collectors of the transistors Tr6 and Tr7 to the output terminals C and D. In this way, the "point-to-multipoint connection at the terminal A" is realized. On the other hand, if the base potentials B1 and B2 of the transistors Tr8 and Tr9 are set to the H-level, then the input terminal B is brought into a state in which it is connected through the collectors of the transistors Tr8 and Tr9 to the output terminals C and D. In this way, the "point-to-multipoint connection at the terminal B" is realized.

As described above, the above switch cell 1 of the second embodiment can be formed of an electronic circuit. Therefore, effect same as that obtained by the switch cell 1 of the first embodiment can also be obtained. However, the point-to-multipoint connection of the second embodiment is accomplished by diverging the signal supplied to the input terminals A and B. Therefore, it is additionally requested that a signal is not supplied to the input terminal A or B which does not take part in the point-to-multipoint connection, and it is different from the above-described case of FIGS. 10 to 13. However, if only the two kinds of functions, i.e., the "cross-connection" and the "bar-connection" are requested, then the circuit arrangement of the second embodiment requires a smaller number of parts as compared with the above-described case of FIGS. 10 to 13.

Figure 17:
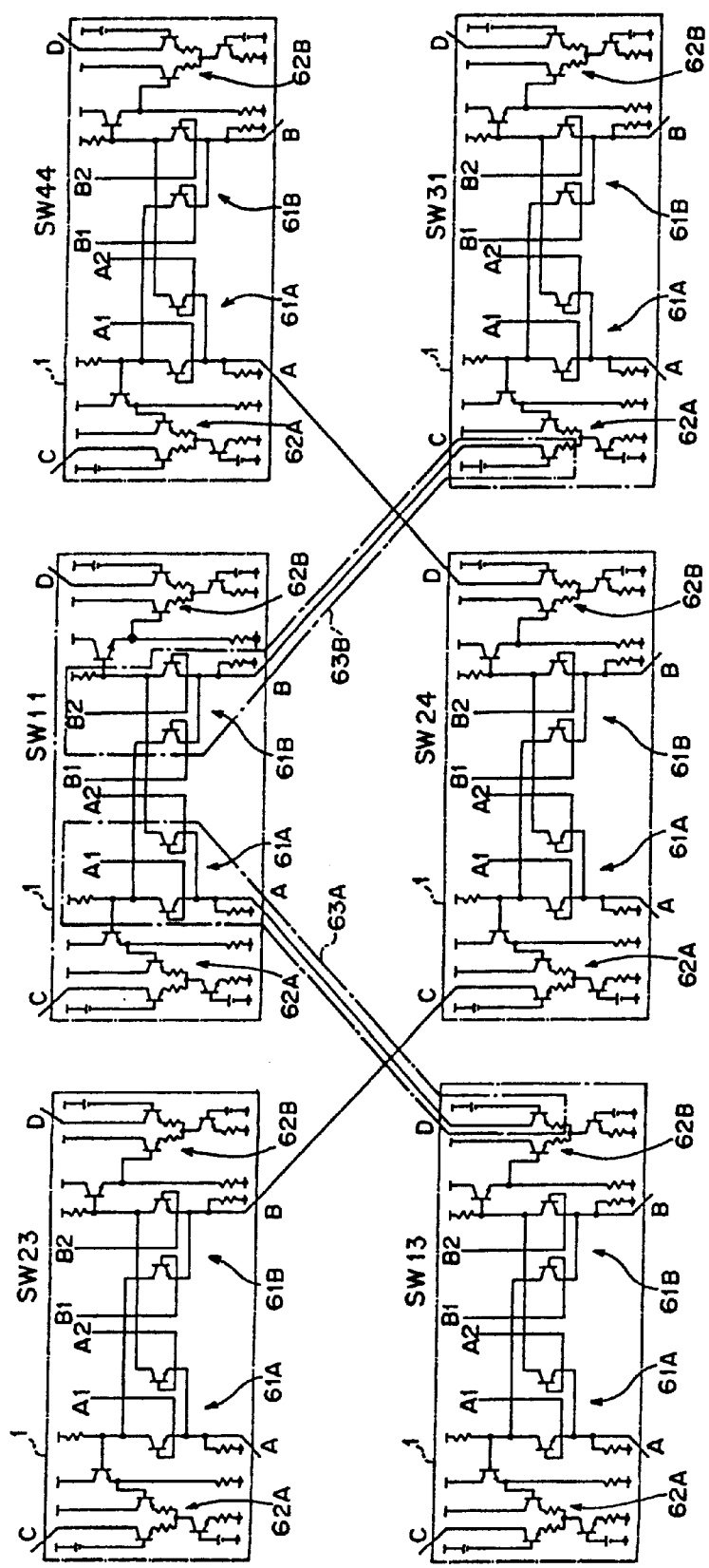
FIG. 17 is an electronic circuit diagram showing an arrangement in which a plurality of electronic circuits each shown in FIG. 16 are interconnected to one another.

FIG. 17 shows a connection arrangement in which the switch cells 1 having the above-arrangement are connected to one another. Also, the arrangement in FIG. 17 typically represents the connection arrangement of the switch cells SW13, SW24 and SW31 positioned on the first column of the switch cell array 1 and the switch cells SW23, SW11 and SW44 positioned on the second column of the same switch cell array shown in FIG. 1. The remaining switch cells 1 are similarly connected to one another. Further, the arrangement of each switch cell 1 is the same as shown in FIG. 16, and hence the reference numerals appearing in FIG. 16 are partially omitted in FIG. 17.

Now, connection arrangement of the switch cell SW11 will be described in detail. As shown in FIG. 17, one input terminal A of the SW11 is connected to the output terminal D of the switch cell SW13 (third different switch cell) while the other input terminal B of the same is connected to the switch cell SW31 (fourth different switch cell).

According to the above connection arrangement, there is formed a (third) cascode interface circuit 63A in which at least one emitter of the transistors Tr6 and Tr7 of the input current switch circuit 61A of the switch cell SW11 is connected in a cascode fashion to the collector of the transistor Tr12 of the output current switch circuit 62B of the switch cell SW13. Also, there is formed a (fourth) cascode interface circuit 63B in which at least one emitter of the transistors Tr8 and Tr9 of the input current switch circuit 61B of the switch cell SW11 is connected in a cascode fashion to the collector of the transistor Tr10 of the output current switch circuit 62A of the switch cell SW31.

The cascode interface circuit similar to that described above is also formed in connection between other switch cells 1.

Therefore, in this case, similarly to the above switch cell of the first embodiment, the switch cells can be prevented from being influenced from the strayed capacity caused between the wiring of the switch cells 1 and also prevented from being influenced from the crosstalk between signals caused from the capacitive coupling between the multilevel crossing of the wiring, with the result that it becomes possible to realize a high rate characteristic that can cope with a signal transmission at an ultrahigh bit-rate such as about 10 Gb/s, for example.

Figure 18:
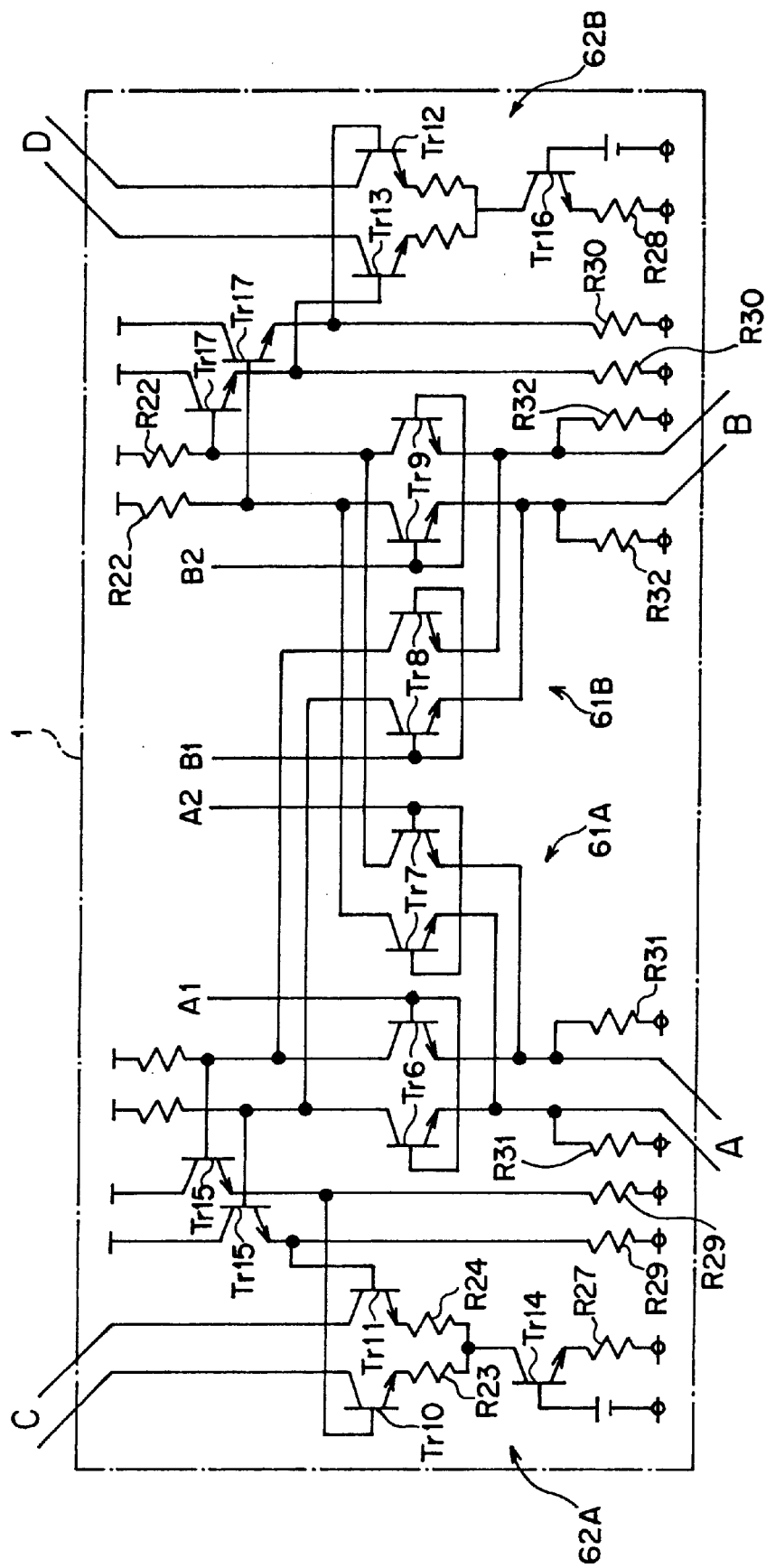
FIG. 18 is an electronic circuit diagram in which the switch cell element shown in FIG. 16 is modified to have a differential arrangement.

Also, similarly to the first embodiment of the present invention, the switch cell 1 shown in FIG. 16 may be made as a differential arrangement as shown in FIG. 18. That is, the input current switch circuits 61A and 61B (the transistors Tr6 to Tr9, the resistor R31, R32 and so on) are arranged as a differential arrangement, each of the emitters of the transistor Tr6 of a differential arrangement is provided as the input terminal A, each of the emitters of the transistor Tr9 of a differential arrangement is provided as the input terminal B, each of the collectors of the transistors Tr10 and Tr11 of a differential arrangement is provided as the output terminal C, and each of the collectors of the transistors Tr12 and Tr13 of a differential arrangement is provided as the output terminal D, whereby input terminals A and B and the output terminals C and D are made as a differential arrangement.

Figure 19:
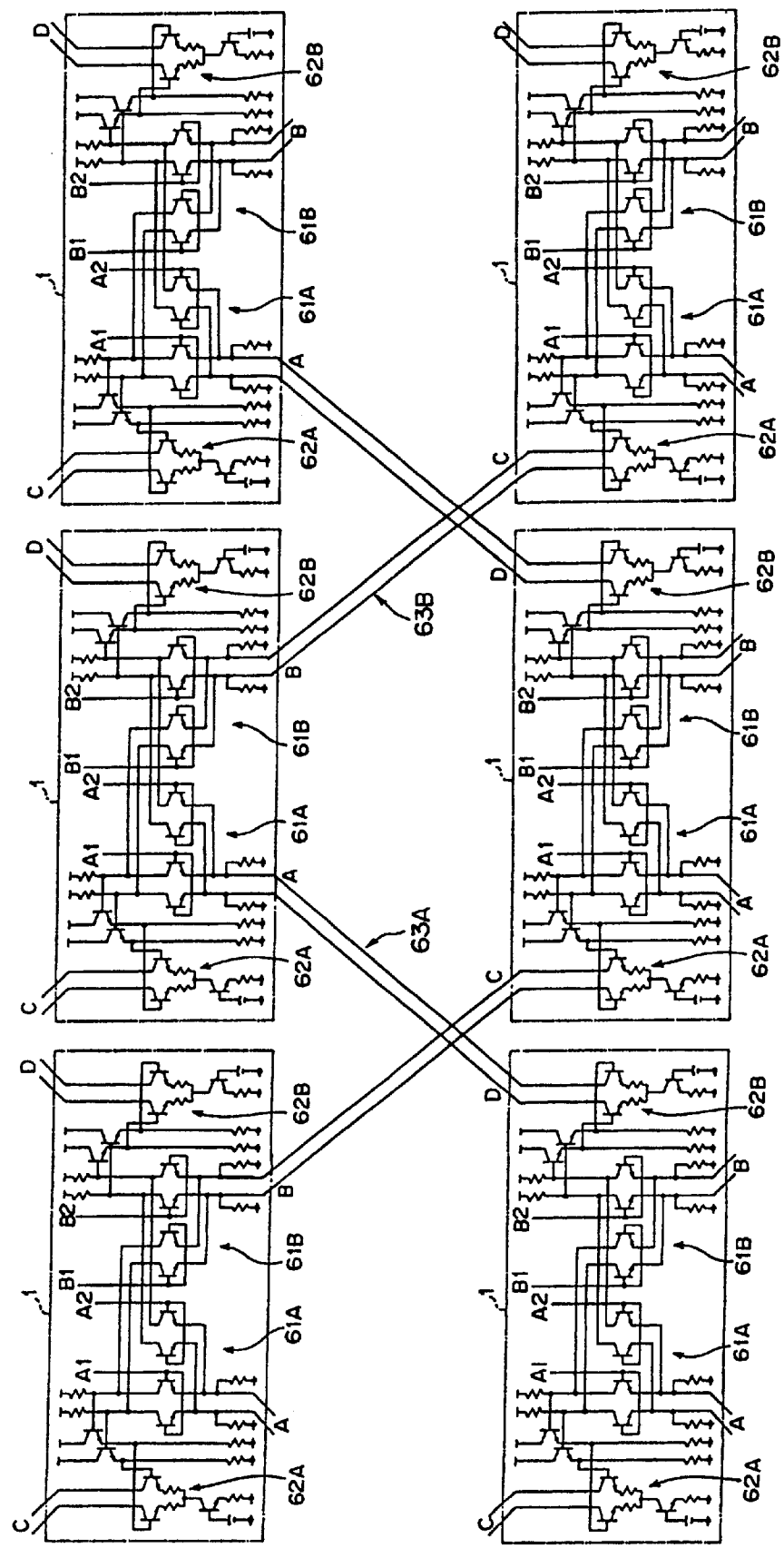
FIG. 19 is an electronic circuit diagram showing an arrangement in which a plurality of switch cells each shown in FIG. 18 are interconnected to one another.

FIG. 19 shows a connection arrangement in which the switch cells 1 having the above-arrangement are connected to one another. Further, the arrangement of each switch cell 1 shown in FIG. 19 is the same as that shown in FIG. 18, and hence the reference numerals appearing in FIG. 18 are partially omitted.

According to the above arrangement, similarly to the first embodiment of the switch cell 1, the following advantages can be obtained as compared with the example shown in FIG. 16.

(1) Influence deriving from switching noise can be suppressed.

(2) The switching circuits can be fabricated into semiconductor integrated circuits with ease.

(3) Stability against fluctuation in the temperature or the power supply voltage can be improved.

(4) When a high rate signal is supplied thereto to drive the circuit at a high speed, the power supply current amount within the circuit can be prevented from fluctuation. Thus, the circuit can be operated at a high speed with stability, and it is possible to suppress influence on other circuits.

(5) The multilevel wiring between the switch cells 1 becomes a multilevel wiring formed of a signal wiring of a differential arrangement. Thus, crosstalk between the signals transmitted at the wiring crosspoint can be more suppressed.

(C) Other Disclosure:

While in the above embodiments the external connecting means 1A to 1D is provided on each side 1*a* to 1*d* of the outermost row or column of the crosspoint switch circuit 1-1 (see FIG. 1), the present invention is not limited thereto but the external connecting means may be provided on only a selected side thereof. Further, if the switch cell 1 is formed of an electronic circuit, the switch cell may constitute the crosspoint switch circuit 1B-1 having no external means 1A to 1D as shown in FIG. 20.

Further, while in the above embodiment the switch cells 1 are connected to one another as shown in FIG. 1 (FIG. 20), the present invention is not limited thereto but any connection arrangement may be employed so long as a perfect non-closing type crosspoint switch circuit can be formed (i.e., any port of the input highway can be made connectable to any one port of the output highway).

Further, while in the above embodiment the switch cell 1 is arranged as described with reference to FIGS. 10 to 19, any arrangement can be employed so long as the arrangement implements the various connecting functions (electronic switch 15A, 15B, 16A, 16B) which have been described with reference to FIGS. 9A to 9E.

Although several embodiments have been described above, these embodiments are merely illustrative and not restrictive. Therefore, it should be said that those skilled in the art can effect various changes and modifications without departing from the spirit and scope of the invention, and thus these changes or modifications should be embraced within the spirit and scope of the claims appended hereto.

What is claimed is:

1. A crosspoint switch circuit comprising:
    a plurality of switch cells arrayed in a matrix fashion to form a matrix array, each of the switch cells being formed of a two-input and two-output type switch comprising a first and second input terminals and a first and second output terminals in which either of the input terminals is made connectable to any of the output terminals, and the switch cells being interconnected and controlled in each connecting status so that any of input lines is made connectable to any of output lines; and
    an external connecting unit connecting each side of the matrix array so that the switch cells arrayed on each side of the matrix array to switch cells arrayed on any side of a matrix array of another crosspoint switch circuit being to neighbor the crosspoint switch circuit.

2. A crosspoint switch circuit according to claim 1, wherein the matrix array of m×n switch cells has m rows and n columns, wherein m and n are integers greater than 1, and the external connecting unit comprises:
    n−1 first output terminal circuits each making the first output terminal of the switch cell positioned at a jth ($1 \leq j \leq n-1$) column of a first row of the matrix connectable to the second input terminal of the switch cell positioned at a j+1th column of an mth row of the matrix of a first different crosspoint switch circuit;
    n−1 first input terminal circuits making the first input terminal of the switch cell positioned at a j+1th column of the first row of the matrix connectable to the second output terminal of the switch cell positioned at the jth column of the mth row of the matrix of the first different crosspoint switch circuit;
    n−1 second output terminal circuits making the second output terminal of the switch cell positioned at the jth column of the mth row of the matrix connectable to the first input terminal of the switch cell positioned at the j+1th column of the first row of the matrix of a second different crosspoint switch circuit;
    n−1 second input terminal circuits making the second input terminal of the switch cell positioned at the j+1th column of the mth row of the matrix connectable to the first output terminal of the switch cell positioned at the jth column of the first row of the matrix of the second different crosspoint switch circuit;
    m−1 third input terminal circuits making the second input terminal of the switch cell positioned at a first column of an ith ($1 \leq i \leq m-1$) row of the matrix connectable to the first output terminal of the switch cell positioned at an nth column of an i+1th row of the matrix of a third different crosspoint switch circuit;
    m−1 fourth input terminal circuits making the first input terminal of the switch cell positioned at the first column of the i+1th row of the matrix connectable to the second output terminal of the switch cell positioned at the nth column of the ith row of the matrix of the third different crosspoint switch circuit;
    m−1 third output terminal circuits making the second output terminal of the switch cell positioned at the nth column of the ith row of the matrix connectable to the first input terminal of the switch cell positioned at the first column of the i+1th row of the matrix of a fourth different crosspoint switch circuit;
    m−1 fourth output terminal circuits making the first output terminal of the switch cell positioned at the nth column of the i+1th row of the matrix connectable to the second input terminal of the switch cell positioned at the first column of the ith row of the matrix of the fourth different crosspoint switch circuit;
    a single fifth input terminal circuit connectable to the first output terminal of the switch cell positioned at the nth column of the first row of the matrix of the third different crosspoint switch circuit;
    a single fifth output terminal circuit connected to the fifth input terminal circuit and connectable to the second input terminal of the switch cell positioned at the nth column of the first row of the matrix of the first different crosspoint switch circuit;
    a single sixth input terminal circuit connectable to the second output terminal of the switch cell positioned at the nth column of the mth row of the matrix of the third different crosspoint switch circuit;
    a single sixth output terminal circuit connectable to the sixth input terminal circuit and connectable to the first input terminal of the switch cell positioned at the first column of the first row of the matrix of the second different crosspoint switch circuit;
    a single seventh input terminal circuit making the first input terminal of the switch cell positioned at the first column of the first row of the matrix connectable to the sixth output terminal circuit of the first different crosspoint switch circuit;
    a single eighth input terminal circuit making the second input terminal of the switch cell positioned at the first column of the mth row of the matrix connectable to the fifth output terminal circuit of the second different crosspoint switch circuit;
    a single seventh output terminal circuit making the first output terminal of the switch cell positioned at the nth column of the first row of the matrix connectable to the fifth input terminal circuit of the fourth different crosspoint switch circuit; and
    a single eighth output terminal circuit making the second output terminal of the switch cell positioned at the nth column of the mth row of the matrix connectable to the sixth input terminal circuit of the fourth different crosspoint switch circuit.

3. A crosspoint switch circuit according to claim 2, wherein
    if the crosspoint switch circuit is not connected with the first different crosspoint switch circuit, then the fifth output terminal circuit and the seventh input terminal circuit on the side of the first input terminal of the switch cell positioned at the first column of the first row are connected to each other while the first output terminal circuit on the side of the first output terminal of the switch cell positioned at the jth column of the first row and the first input terminal circuit on the side of the first input terminal of the switch cell positioned at the j+1th column of the first row are connected to each other.

4. A crosspoint switch circuit according to claim 2, wherein if the crosspoint switch circuit is not connected with the second different crosspoint switch circuit, then the sixth output terminal circuit and the eighth input terminal circuit on the side of the second input terminal of the switch cell positioned at the first column of the mth row are connected to each other while the second output terminal circuit on the side of the second output terminal of the switch cell positioned at the jth column of the mth row and the second input terminal circuit on the side of the second input terminal of the switch cell positioned at the j+1th column of the mth row are connected to each other.

5. A crosspoint switch circuit according to claim 2, wherein the third to sixth input terminal circuits are provided on one side corresponding to the first column of the matrix array, the third, fourth, seventh and eighth output terminal circuits are provided on one side corresponding to the nth column of the matrix array, the first and seventh input terminal circuits and the first and fifth output terminal circuits are provided on one side corresponding to the first row of the matrix array, and the second and eighth input terminal circuits and the second and sixth output terminal circuits are provided on one side corresponding to the mth row of the matrix array.

6. A crosspoint switch circuit according to claim 2, wherein each of the input terminal circuits is provided on one side corresponding to the first column of the matrix, and each of the output terminal circuits is provided on one side corresponding to the nth column of the matrix.

7. A crosspoint switch circuit according to claim 1, wherein the switch cell is formed of an electronic circuit.

8. A crosspoint switch circuit according to claim 7, wherein the switch cell comprises:

a first electronic switch unit electrically connecting the first input terminal to at least one of the first and second output terminals, and a second electronic switch unit electrically connecting the second input terminal to at least one of the first and second output terminals.

9. A crosspoint switch circuit according to claim 8, wherein the switch cell comprises:

a first input circuit comprising a first transistor with a base grounded and a first load resistor electrically connected to a collector of the first transistor, an emitter of the first transistor being provided as the first input terminal;

a second input circuit comprising a second transistor with a base grounded and a second load resistor electrically connected to a collector of the second transistor, an emitter of the second transistor being provided as the second input terminal; and first to fourth output current switch circuits each comprising a third and fourth transistors with respective emitters connected to each other to form a differential arrangement, the first and second output current switch circuits forming the first electronic switch unit and the third and fourth output current switch circuits forming the second electronic switch unit, wherein the third transistor of the first output current switch circuit and the fourth transistor of the third output current switch circuit are electrically connected in parallel at each collector to form the first output terminal, while the third transistor of the second output current switch circuit and the fourth transistor of the fourth output current switch circuit are electrically connected in parallel at each collector to form the second output terminal, the respective fourth transistors of the first and second output current switch circuits are electrically connected in parallel at each base to the first load resistor of the first input circuit, the respective third transistors of the third and fourth output current switch circuits are electrically connected in parallel at each base to the second load resistor of the second input circuit, and currents flowing through the first to fourth output current switch circuits are controlled, wherein the connecting status representing the connection between the first and second input terminals and the first and second output terminals is changed.

10. A crosspoint switch circuit according to claim 9, wherein the interconnection between the switch cells are arranged where if the first input terminal is electrically connected to a second output terminal of a first different switch cell, then the first transistor of the first input circuit is electrically connected at an emitter to a fourth transistor of the fourth output current switch circuit of the first different switch cell at a collector in a cascode fashion to form a first cascode interface circuit, and if the second input terminal is electrically connected to a first output terminal of a second different switch cell, then the second transistor of the second input circuit is electrically connected at an emitter to a third transistor of the first output current switch circuit of the second different switch cell at a collector in a cascode fashion to form a second cascode interface circuit.

11. A crosspoint switch circuit according to claim 9, wherein the first and second input circuits, the first and second input terminals, and the first and second output terminals are respectively formed into differential arrangements.

12. A crosspoint switch circuit according to claim 9, further comprising:

first to fourth current source circuits each comprising a fifth transistor of which a collector is electrically connected to one of the first to fourth output current switch circuits, and of which an emitter is electrically connected to a third load resistor, wherein the base potential of each fifth transistor of the current source circuit is independently controlled, wherein currents flowing in each of the first to fourth output current switch circuits are controlled.

13. A crosspoint switch circuit according to claim 9, further comprising:
a first current switch control circuit allowing a current to be flowed in only one of the first and third output current switch circuits, and
a second current switch control circuit allowing a current to be flowed in only one of the second and fourth output current switch circuits.

14. A crosspoint switch circuit according to claim 8, wherein the switch cell comprises:
a third input current switch circuit, serving as the first electronic switch unit, comprising sixth and seventh transistors of which emitters are electrically connected in parallel to form the first input terminal;
a fourth input current switch circuit, serving as the second electronic switch unit, comprising eighth and ninth transistors of which emitters are electrically connected in parallel to form the second input terminal;
a fourth load resistor electrically connected to each collector of the sixth and eighth transistors in a parallel fashion;
a fifth load resistor electrically connected to each collector of the seven and ninth transistors in a parallel fashion;
a fifth output current switch circuit comprising tenth and eleventh transistors electrically connected to each other through respective emitters to form a differential arrangement, a collector of the tenth transistor being provided as the first output terminal, and a base of the eleventh transistor being connected to the fourth load resistor; and
a sixth output current switch circuit comprising twelfth and thirteenth transistors electrically connected to each other through respective emitters to form a differential arrangement, a collector of the twelfth transistor being provided as the second output terminal, and a base of the thirteenth transistor being electrically connected to the fifth load resistor, wherein
each base potential of the sixth to ninth transistors is independently controlled, wherein the connecting status representing the connection between the first and second input terminals and the first and second output terminals is changed.

15. A crosspoint switch circuit according to claim 14, wherein the interconnection between the switch cells are arranged where
if the first input terminal is electrically connected to a second output terminal of a third different switch cell, then at least one of the sixth and seventh transistors of the third input current switch circuit is electrically connected at the emitter to a twelfth transistor of a sixth output current switch circuit of the third different switch cell at the collector in a cascode fashion to form a third cascode interface circuit, and
if the second input terminal is electrically connected to a first output terminal of a fourth different switch cell, then at least one of the eighth and ninth transistors of the fourth input current switch circuit is electrically connected at the emitter to a tenth transistor of a fifth output current switch circuit of the fourth different switch cell at the collector in a cascode fashion to form a fourth cascode interface circuit.

16. A crosspoint switch circuit according to claim 14, wherein
the third and fourth input current switch circuits, the first and second input terminals, and the first and second output terminals are respectively formed into differential arrangements.

17. A crosspoint switch circuit according to claim 1, wherein the switch cell is formed of an optical circuit.

18. A crosspoint switch circuit comprising a plurality of crosspoint switch circuits arrayed to form a matrix array, each of said crosspoint switch circuits comprising:
a plurality of switch cells arrayed in a matrix fashion to form a matrix array, each of the switch cells being formed of a two-input and two-output type switch comprising a first and second input terminals and a first and second output terminals in which either of the input terminals is made connectable to any of the output terminals, and the switch cells being interconnected and controlled in each connecting status so that any one of input lines is made connectable to any of output lines, and
external connecting units connecting the switch cells arrayed on each side of the matrix array to switch cells arrayed on any side of a matrix array of another crosspoint switch circuit being to neighbor the crosspoint switch circuit, wherein
the plurality of crosspoint switch circuits is interconnected to one another so as to form the matrix array through each of the external connecting units.

19. A crosspoint switch circuit comprising a plurality of matrix-arrayed crosspoint switch circuits each comprising a plurality of crosspoint switch circuits arrayed to form a matrix array, each of said crosspoint switch circuits comprising:
a plurality of switch cells arrayed in a matrix fashion to form a matrix array, each of the switch cells being formed of a two-input type switch and a two-output type switch comprising a first and second input terminals and a first and second output terminals in which either of the input terminals is made connectable to any of the output terminals, and the switch cells being interconnected and controlled in each connecting status so that any of input lines is made connectable to any of output lines; and
external connecting units connecting the switch cells arrayed on each side of the matrix array to switch cells arrayed on any side of a matrix array of another crosspoint switch circuit being to neighbor the crosspoint switch circuit, wherein
the plurality of crosspoint switch circuits are interconnected to one another so as to form the matrix array through each of the external connecting units, and the plurality of matrix-arrayed crosspoint switch circuits are interconnected to one another so as to form the matrix array through each of the external connecting units and arranged in a three-dimensional fashion.

20. A crosspoint switch circuit according to claim 19, wherein the matrix-arrayed crosspoint switch circuits are interconnected to one another at each external connecting units through a flat cable.

21. A crosspoint switch circuit connecting a plurality of input lines to a plurality of output lines, comprising:
a plurality of switch cells arrayed in a matrix fashion to form a matrix array, each of the switch cells being formed of a two-input and two-output type switch comprising a first and second input terminals and a first and second output terminals in which either of the input terminals is made connectable to any of the output terminals, and the switch cells being interconnected and controlled in each connecting status so that any of the input lines is made connectable to any of the output lines; and an external connecting unit provided on each side of the matrix array so that the switch cells arrayed on at least one side of the matrix array are made connectable to switch cells arrayed on any side of a matrix array of another crosspoint switch circuit being to neighbor the crosspoint switch circuit.

22. A switch cell electronic circuit, comprising:

a plurality of switch cells in a matrix array, each of the switch cells comprising first and second input terminals and first and second output terminals;

a first electronic switch unit electrically connecting one of the first input terminals to one of the first and second output terminals;

a second electronic switch unit electrically connecting one of the second input terminals to one of the first and second output terminals; and external connecting units connecting the switch cells arrayed on each side of the matrix array to switch cells arrayed on any side of a matrix array of another switch cell electronic circuit being to neighbor the switch cell electronic circuit, wherein said switch cell electronic circuit is controlled by one of
  a cross connection made by controlling said first and second electronic switch units so as to connect one of the first input terminals to one of the second output terminals and one of the second input terminals to one of the first output terminals,
  a bar connection made by controlling said first and second electronic switch units so as to connect one of the first input terminals to one of the first output terminals and one of the second input terminals to one of the second output terminals,
  a first point to multipoint connection made by controlling said first and second electronic switch units so as to connect one of the first input terminals to both first and second output terminals of a common switch cell, and
  a second point to multipoint connection made by controlling said first and second electronic switch units so as to connect one of the second input terminals to both first and second output terminals of a common switch cell.

23. A switch cell electronic circuit comprised of a switch cell of a two-input and two-output type comprising first and second input terminals and first and second output terminals, comprising:

a first electronic switch unit electrically connecting the first input terminal to at least one of the first and second output terminals and a second electronic switch unit electrically connecting the second input terminal to at least one of the first and second output terminals, wherein the switch cell comprises
  a first input circuit comprising a first transistor with a base grounded and a first load resistor connected to a collector of the first transistor, an emitter of the first transistor being provided as the first input terminal;
  a second input circuit comprising a second transistor with a base grounded and a second load resistor connected to a collector of the second transistor, an emitter of the second transistor being provided as the second input terminal; and
  first to fourth output current switch circuits each comprising a third and fourth transistors with respective emitters connected to each other to form a differential arrangement, the first and second output current switch circuits forming the first electronic switch unit while the third and fourth output current switch circuits forming the second electronic switch unit, wherein
    the third transistor of the first output current switch circuit and the fourth transistor of the third output current switch circuit are connected in parallel at each collector to form the first output terminal, while the third transistor of the second output current switch circuit and the fourth transistor of the fourth output current switch circuit are connected in parallel at each collector to form the second output terminal,
    the respective fourth transistors of the first and second output current switch circuits are connected in parallel at each base to the first load resistor of the first input circuit,
    the respective third transistors of the third and fourth output current switch circuits are connected in parallel at each base to the second load resistor of the second input circuit, and
    currents flowing through the first to fourth output current switch circuits are controlled, wherein the connecting status representing the connection between the first and second input terminals and the first and second output terminals is changed.

24. A switch cell electronic circuit according to claim 23, wherein the interconnection between the switch cells are arranged where
  if the first input terminal is connected to a second output terminal of a first different switch cell, then the first transistor of the first input circuit is connected at the emitter to a fourth transistor of a fourth output current switch circuit of the first different switch cell at a collector in a cascode fashion to form a first cascode interface circuit, and
  if the second input terminal is connected to a first output terminal of a second different switch cell, then the second transistor of the second input circuit is connected at the emitter to a third transistor of a first output current switch circuit of the second different switch cell at a collector in a cascode fashion to form a second cascode interface circuit.

25. A switch cell electronic circuit according to claim 23, wherein
  the first and second input circuits, the first and second input terminals, and the first and second output terminals are respectively formed into differential arrangements.

26. A switch cell electronic circuit according to claim 23, further comprising:
  first to fourth current source circuits each comprising a fifth transistor of which collector is connected to one of the first to fourth output current switch circuits, and of which emitter is connected to a third load resistor, wherein
  the base potential of each fifth transistor of the current source circuits is independently controlled, wherein currents flowing through the first to fourth output current switch circuits are controlled.

27. A switch cell electronic circuit according to claim 23, further comprising:
  a first current switch control circuit allowing a current to be flowed in only one of the first and third output current switch circuits, and a second current switch control circuit allowing a current to be flowed in only one of the second and fourth output current switch circuits.

28. A switch cell electronic circuit comprised of a switch cell of a two-input and two-output type comprising first and second input terminals and first and second output terminals, comprising:

a first electronic switch unit electrically connecting the first input terminal to at least one of the first and second output terminals and a second electronic switch unit electrically connecting the second input terminal to at least one of the first and second output terminals, the switch cell comprising a third input current switch circuit, serving as the first electronic switch unit, comprising sixth and seventh transistors of which emitters are connected in parallel to form the first input terminal;

a fourth input current switch circuit, serving as the second electronic switch unit, comprising eighth and ninth transistors of which emitters are connected in parallel to form the second input terminal;

a fourth load resistor connected to each collector of the sixth and eighth transistors in a parallel fashion;

a fifth load resistor connected to each collector of the seventh and ninth transistors in a parallel fashion;

a fifth output current switch circuit comprising tenth and eleventh transistors connected to each other through the respective emitters to form a differential arrangement, a collector of the tenth transistor being provided as the first output terminal, and a base of the eleventh transistor being connected to the fourth load resistor; and a sixth output current switch circuit comprising twelfth and thirteenth transistors connected to each other through the respective emitters to form a differential arrangement, a collector of the twelfth transistor being provided as the second output terminal, and a base of the thirteenth transistor being connected to the fifth load resistor, wherein each base potential of the sixth to ninth transistors is independently controlled, where the connecting status representing the connection between the first and second input terminals and the first and second output terminals is changed.

29. A switch cell electronic circuit according to claim 28, wherein the interconnection between the switch cells are arranged where if the first input terminal is connected to a second output terminal of a third different switch cell, then at least one of the sixth and seventh transistors of the third input current switch circuit is connected at the emitter to a twelfth transistor of a sixth output current switch circuit of the third different switch cell at a collector in a cascode fashion to form a third cascode interface circuit, and if the second input terminal is connected to a first output terminal of a fourth different switch cell, then at least one of the eighth and ninth transistors of the fourth input current switch circuit is connected at the emitter to a tenth transistor of a fifth output current switch circuit of the fourth different switch cell at a collector in a cascode fashion to form a fourth cascode interface circuit.

30. A switch cell electronic circuit according to claim 28, wherein the third and fourth input current switch circuits, the first and second input terminals, and the first and second output terminals are respectively formed into differential arrangements.

* * * * *

UNITED STATES PATENT AND TRADEMARK OFFICE
CERTIFICATE OF CORRECTION

PATENT NO.   : 6,525,563 B2                                                   Page 1 of 1
DATED        : February 25, 2003
INVENTOR(S)  : Hiroshi Hamano et al.

It is certified that error appears in the above-identified patent and that said Letters Patent is hereby corrected as shown below:

<u>Title page,</u>
Item [56], References Cited, U.S. PATENT DOCUMENTS, please insert
-- 4,837,855  6/6/1989  Hajikano et al. --

FOREIGN PATENT DOCUMENTS, please insert

|  | | | |
|---|---|---|---|
| -- | JP | 5-300547 | 11/12/1993 |
|  | JP | 6-252940 | 9/9/1994 |
|  | JP | 7-67152 | 3/10/1995 |
|  | JP | 55-163995 | 12/20/1980 |
|  | JP | 9-51558 | 2/18/1997 |
|  | JP | 8-251632 | 9/27/1996 |
|  | JP | 63-500140 | 1/14/1988 |
|  | JP | 63-244993 | 10/12/1988 -- |

Signed and Sealed this

Twenty-fourth Day of June, 2003

JAMES E. ROGAN
*Director of the United States Patent and Trademark Office*